US011868101B2

(12) United States Patent
Jermann et al.

(10) Patent No.: US 11,868,101 B2
(45) Date of Patent: *Jan. 9, 2024

(54) COMPUTER SYSTEM AND METHOD FOR CREATING AN EVENT PREDICTION MODEL

(71) Applicant: UPTAKE TECHNOLOGIES, INC., Chicago, IL (US)

(72) Inventors: Michael Jermann, Chicago, IL (US); John Patrick Boueri, Chicago, IL (US)

(73) Assignee: UPTAKE TECHNOLOGIES, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,235

(22) Filed: Oct. 25, 2022

(65) Prior Publication Data

US 2023/0112083 A1 Apr. 13, 2023

Related U.S. Application Data

(63) Continuation of application No. 16/256,992, filed on Jan. 24, 2019, now Pat. No. 11,480,934.

(51) Int. Cl.
*G05B 13/04* (2006.01)
*G06F 9/54* (2006.01)
*G05B 23/02* (2006.01)

(52) U.S. Cl.
CPC ......... *G05B 13/048* (2013.01); *G05B 13/041* (2013.01); *G05B 23/0208* (2013.01); *G06F 9/54* (2013.01)

(58) Field of Classification Search
CPC ............................ G05B 13/048; G05B 13/041; G05B 23/0208; G06F 9/54
See application file for complete search history.

(56) References Cited

U.S. PATENT DOCUMENTS 5,566,092 A 10/1996 Wang et al.
5,633,800 A 5/1997 Bankert et al.
(Continued)

FOREIGN PATENT DOCUMENTS

EP 712060 5/1996
EP 712060 B1 8/2000
(Continued)

OTHER PUBLICATIONS

Biswas, Trisha. Redundancy-based Approaches in Wireless Multihop Network Design. PhD Dissertation Submitted to Graduate Faculty of North Carolina State University, Raleigh, North Carolina, Mar. 25, 2014, pp. 1-141 [online], [retrieved on May 26, 2015]. Retrieved from the Internet <URL:https://repositorylib.ncsusedu/bitstream/handle/1840.16/9313/etd.pdf?sequence=28zisAllowed=6>.
(Continued)

*Primary Examiner* — Ziaul Karim
(74) *Attorney, Agent, or Firm* — MARSHALL, GERSTEIN & BORUN LLP

(57) ABSTRACT

Disclosed is a process for creating an event prediction model that employs a data-driven approach for selecting the model's input data variables, which, in one embodiment, involves selecting initial data variables, obtaining a respective set of historical data values for each respective initial data variable, determining a respective difference metric that indicates the extent to which each initial data variable tends to be predictive of an event occurrence, filtering the initial data variables, applying one or more transformations to at least two initial data variables, obtaining a respective set of historical data values for each respective transformed data variable, determining a respective difference metric that indicates the extent to which each transformed data variable tends to be predictive of an event occurrence, filtering the transformed data variables, and using the filtered, trans-
(Continued)

formed data variables as a basis for selecting the input variables of the event prediction model.

20 Claims, 8 Drawing Sheets

(56) References Cited

U.S. PATENT DOCUMENTS

| | | | |
|---|---|---|---|
| 6,256,594 B1 | 7/2001 | Yamamoto et al. |
| 6,336,065 B1 | 1/2002 | Gibson et al. |
| 6,442,542 B1 | 8/2002 | Ramani et al. |
| 6,473,659 B1 | 10/2002 | Shah et al. |
| 6,622,264 B1 | 9/2003 | Bliley et al. |
| 6,634,000 B1 | 10/2003 | Jammu et al. |
| 6,643,600 B2 | 11/2003 | Yanosik, Jr. et al. |
| 6,650,949 B1 | 11/2003 | Fera et al. |
| 6,725,398 B1 | 4/2004 | Varma et al. |
| 6,760,631 B1 | 7/2004 | Berkowitz et al. |
| 6,775,641 B2 | 8/2004 | Wegerich et al. |
| 6,799,154 B1 | 9/2004 | Aragones et al. |
| 6,823,253 B2 | 11/2004 | Brunell |
| 6,859,739 B2 | 2/2005 | Wegerich et al. |
| 6,892,163 B1 | 5/2005 | Herzog et al. |
| 6,947,797 B2 | 9/2005 | Dean et al. |
| 6,952,662 B2 | 10/2005 | Wegerich et al. |
| 6,957,172 B2 | 10/2005 | Wegerich |
| 6,975,962 B2 | 12/2005 | Wegerich et al. |
| 7,020,595 B1 | 3/2006 | Adibhatla et al. |
| 7,082,379 B1 | 7/2006 | Bickford et al. |
| 7,100,084 B2 | 8/2006 | Unkle et al. |
| 7,107,491 B2 | 9/2006 | Graichen et al. |
| 7,127,371 B2 | 10/2006 | Duckert et al. |
| 7,233,886 B2 | 6/2007 | Wegerich et al. |
| 7,280,941 B2 | 10/2007 | Bonanni et al. |
| 7,308,385 B2 | 12/2007 | Wegerich et al. |
| 7,373,283 B2 | 5/2008 | Herzog et al. |
| 7,403,869 B2 | 7/2008 | Wegerich et al. |
| 7,409,320 B2 | 8/2008 | Wegerich |
| 7,415,382 B1 | 8/2008 | Bickford et al. |
| 7,428,478 B2 | 9/2008 | Aragones |
| 7,447,666 B2 | 11/2008 | Wang |
| 7,457,693 B2 | 11/2008 | Olsen et al. |
| 7,457,732 B2 | 11/2008 | Aragones et al. |
| 7,509,235 B2 | 3/2009 | Bonissone et al. |
| 7,536,364 B2 | 5/2009 | Subbu et al. |
| 7,539,597 B2 | 5/2009 | Wegerich et al. |
| 7,548,830 B2 | 6/2009 | Goebel et al. |
| 7,634,384 B2 | 12/2009 | Eryurek et al. |
| 7,640,145 B2 | 12/2009 | Wegerich et al. |
| 7,660,705 B1 | 2/2010 | Meek et al. |
| 7,725,293 B2 | 5/2010 | Bonissone et al. |
| 7,739,096 B2 | 6/2010 | Wegerich et al. |
| 7,756,678 B2 | 7/2010 | Bonissone et al. |
| 7,822,578 B2 | 10/2010 | Kasztenny et al. |
| 7,869,908 B2 | 1/2011 | Walker |
| 7,919,940 B2 | 4/2011 | Miller et al. |
| 7,941,701 B2 | 5/2011 | Wegerich et al. |
| 7,962,240 B2 | 6/2011 | Morrison et al. |
| 8,024,069 B2 | 9/2011 | Miller et al. |
| 8,050,800 B2 | 11/2011 | Miller et al. |
| 8,145,578 B2 | 3/2012 | Pershing et al. |
| 8,229,769 B1 | 7/2012 | Hopkins, III |
| 8,234,420 B2 | 7/2012 | Lueckenbach et al. |
| 8,239,170 B2 | 8/2012 | Wegerich |
| 8,275,577 B2 | 9/2012 | Herzog |
| 8,285,402 B2 | 10/2012 | Lueckenbach et al. |
| 8,311,774 B2 | 11/2012 | Hines |
| 8,352,216 B2 | 1/2013 | Subbu et al. |
| 8,532,795 B2 | 9/2013 | Adavi et al. |
| 8,533,018 B2 | 9/2013 | Miwa et al. |
| 8,560,494 B1 | 10/2013 | Downing et al. |
| 8,620,618 B2 | 12/2013 | Eryurek et al. |
| 8,620,853 B2 | 12/2013 | Herzog |
| 8,626,385 B2 | 1/2014 | Humphrey |
| 8,645,276 B2 | 2/2014 | Wong et al. |
| 8,660,980 B2 | 2/2014 | Herzog |
| 8,689,108 B1 | 4/2014 | Duffield et al. |
| 8,713,467 B1 | 4/2014 | Goldenberg et al. |
| 8,786,605 B1 | 7/2014 | Curtis et al. |
| 8,799,799 B1 | 8/2014 | Cervelli et al. |
| 8,812,960 B1 | 8/2014 | Sun et al. |
| 8,832,594 B1 | 9/2014 | Thompson et al. |
| 8,862,938 B2 | 10/2014 | Souvannarath |
| 8,868,537 B1 | 10/2014 | Colgrove et al. |
| 8,886,601 B1 | 11/2014 | Landau et al. |
| 8,909,656 B2 | 12/2014 | Kumar et al. |
| 8,917,274 B2 | 12/2014 | Ma et al. |
| 8,918,246 B2 | 12/2014 | Friend |
| 8,924,429 B1 | 12/2014 | Fisher et al. |
| 8,935,201 B1 | 1/2015 | Fisher et al. |
| 8,937,619 B2 | 1/2015 | Sharma et al. |
| 8,938,686 B1 | 1/2015 | Erenrich et al. |
| 10,826,932 B2 | 11/2020 | Abbaszadeh et al. |
| 2002/0091972 A1 | 7/2002 | Harris et al. |
| 2002/0152056 A1 | 10/2002 | Herzog et al. |
| 2003/0055666 A1 | 3/2003 | Roddy et al. |
| 2003/0126258 A1 | 7/2003 | Conkright et al. |
| 2004/0083452 A1* | 4/2004 | Minor .................. G16B 50/20 717/109 |
| 2004/0181712 A1 | 9/2004 | Taniguchi et al. |
| 2004/0243636 A1 | 12/2004 | Hasiewicz et al. |
| 2005/0119905 A1 | 6/2005 | Wong et al. |
| 2005/0222747 A1 | 10/2005 | Vhora et al. |
| 2007/0031003 A1* | 2/2007 | Cremers .............. G06V 10/755 382/173 |
| 2007/0263628 A1 | 11/2007 | Axelsson et al. |
| 2008/0059080 A1 | 3/2008 | Greiner et al. |
| 2008/0059120 A1 | 3/2008 | Xiao et al. |
| 2009/0132347 A1* | 5/2009 | Anderson ............ G06Q 30/02 705/30 |
| 2012/0271612 A1 | 10/2012 | Barsoum et al. |
| 2012/0310597 A1 | 12/2012 | Uchiyama et al. |
| 2013/0010610 A1 | 1/2013 | Karthikeyan et al. |
| 2013/0024416 A1 | 1/2013 | Herzog |
| 2013/0283773 A1 | 10/2013 | Hague |
| 2013/0325502 A1 | 12/2013 | Robicsek et al. |
| 2014/0012886 A1 | 1/2014 | Downing et al. |
| 2014/0032132 A1 | 1/2014 | Stratton et al. |
| 2014/0060030 A1 | 3/2014 | Ma et al. |
| 2014/0089035 A1 | 3/2014 | Jericho et al. |
| 2014/0105481 A1 | 4/2014 | Hasselbusch et al. |
| 2014/0121868 A1 | 5/2014 | Zhang et al. |
| 2014/0169398 A1 | 6/2014 | Arndt et al. |
| 2014/0170617 A1 | 6/2014 | Johnson et al. |
| 2014/0184643 A1 | 7/2014 | Friend |
| 2014/0222355 A1 | 8/2014 | Cheim et al. |
| 2014/0330600 A1 | 11/2014 | Candas et al. |
| 2014/0330749 A1 | 11/2014 | Candas et al. |
| 2014/0351642 A1 | 11/2014 | Bates et al. |
| 2014/0357295 A1 | 12/2014 | Skomra et al. |
| 2014/0358601 A1 | 12/2014 | Smiley et al. |
| 2015/0046870 A1 | 2/2015 | Goldenberg et al. |
| 2015/0262060 A1 | 9/2015 | Husain et al. |
| 2017/0061284 A1* | 3/2017 | Amano .................. G06N 5/025 |
| 2017/0063896 A1* | 3/2017 | Muddu ............... G06F 3/04842 |
| 2017/0109649 A1* | 4/2017 | Baughman ............ G06N 20/00 |
| 2018/0144815 A1* | 5/2018 | Chapman-McQuiston ................. G16H 50/30 |
| 2019/0258904 A1 | 8/2019 | Ma et al. |

FOREIGN PATENT DOCUMENTS

| | | |
|---|---|---|
| JP | 2015179454 | 10/2015 |
| JP | 2015179454 A | 10/2015 |
| WO | 2011117570 | 9/2011 |
| WO | WO-2011117570 A1 | 9/2011 |
| WO | 2013034420 | 2/2013 |
| WO | WO-2013034420 A1 | 3/2013 |
| WO | 2014145977 | 5/2014 |
| WO | WO-2014145977 A1 | 9/2014 |

(56) References Cited

FOREIGN PATENT DOCUMENTS

WO       2014205497        12/2014
WO    WO-2014205497 A1    12/2014

OTHER PUBLICATIONS

International Searching Authority International Search Report and Written Opinion for PCT/US2019/069060, dated May 4, 2020, 10 pages.

Biswas, Trisha. Redundancy-based Approaches in Wireless Multihop Network Design. PhD Dissertation Submitted to Graduate Faculty of North Carolina State University, Raleigh, North Carolina, Mar. 25, 2014, pp. 1-141 [online], [retrieved on May 26, 2015]. Retrieved from the Internet <URL:https://repositorylib.ncsusedu/bitstream/handle/1840.16/9313/etd.pdf?sequence=28zisAllowed=y>.

Isermann, Rolf. Model-based Fault Detection and Diagnosis-Status and Applications. Institute of Automatic Control, Darmstadt University of Technology, Darmstadt, Germany. Jun. 2004, pp. 1-12. [online], [retrieved on Oct. 8, 2015]. Retrieved from the Internet <URL: http://citeseerx.ist.psthedu/viewdoc/download?doi=10.1.1.113 .92958zrep=repl&type=fflilf>.

Narasimhan et al. Combining Model-Based and Feature-Driven Diagnosis Approaches—A Case Study on Electromechanical Actuators. 21st International Workshop on Principles of Diagnosis 2010, pp. 1-8. [online], [retrieved on Oct. 8, 2015] Retrieved from the Internet <CRE:https://tiarc.nasa.govipublications/2266/download/>.

Prentzas et al. Categorizing Approaches Combining Rule-Based and Case-Based Reasoning. Expert Systems 24, Apr. 17, 2007, pp. 1-34 [online], [retrieved on Oct. 8, 2015]. Retrieved from the Internet <URL : http: Ilciteseerx ist.psu sedu/viewdoc/download?doi=10 .1 .1.143.27808zrep=repl&type=pdf>.

Infor M3 Enterprise Management System. Datasheet [online]. Infor, 2014 [retrieved May 19, 2015]. Retrieved from the Internet: <URL:www.inforscom.html>.

Infor Equipment. Datasheet [online]. Infor, 2012 [retrieved May 19, 2015]. Retrieved from the Internet: <URL:www.infor.com.html>.

Infor Introduces Next-Generation Solution for Equipment Dealers and Service Providers. Infor, Feb. 2014 pp. 1-5. [online], [retrieved May 19, 2015]. Retrieved from the Internet: <URL:www.infor.com/companyinews/pressroom/pressreleases/M3equipment.html>.

Infor Equipment for Rental Datasheet [online] Infor, 2013 [retrieved May 19, 2015]. Retrieved from the Internet:<URL:www.infor.com.html>.

Waltermire et al. Applying the Continuous Monitoring Technical Reference Model to the Asset, Configuration and Vulnerability Management Domains (DRAFT). National Institute of Standards and Technology, U.S. Department of Commerce, Jan. 2012, pp. 1-23 [online], [retrieved Oct. 6. 2015]. Retrieved from the Internet: URL<https ://c src.ni st. gov/C SRC/media/Publications/11i stir/7800/draft/documents/Draft -NISTIR-7800 spdf.

\* cited by examiner

COMPUTER SYSTEM AND METHOD FOR CREATING AN EVENT PREDICTION MODEL

BACKGROUND

Today, machines (also referred to herein as "assets") are ubiquitous in many industries. From locomotives that transfer cargo across countries to farming equipment that harvest crops, assets play an important role in everyday life. Depending on the role that an asset serves, its complexity, and cost, may vary.

Because of the increasing role that assets play, it is also becoming increasingly desirable to monitor and analyze the operation of assets in a given operating environment. To facilitate this, assets may be equipped with sensors that are configured to monitor various operating parameters of the asset and an on-asset computer that is configured to send data indicative of these operating parameters over a network to a central data analytics platform that is configured to analyze the data, in order to learn more about the operation of the assets.

Overview

In recent years, one primary area of focus for a data analytics platform has become the preemptive prediction of certain types of event occurrences that impact asset operation, such as occurrences of failures on an asset. The main reason that preemptive prediction of event occurrences has become an area of focus is because unexpected occurrences of certain types of events may result in significant consequences. For instance, if a failure occurs on an asset while it is in use, this may increase the time and/or cost necessary to get the asset back to an operational state, decrease productivity during the downtime, and potentially present a safety risk to individuals in proximity to the asset at the time that it fails.

In view of the foregoing, significant time, effort, and resources are now being dedicated to creating and deploying event prediction models that are configured to predict whether event occurrences are forthcoming and then preemptively notify a user of forthcoming event occurrences sufficiently in advance of when such event occurrences actually happen, so that action can be taken to address the event occurrences before they actually happen. In this way, an event prediction model may help to mitigate the costs that may otherwise result from an unexpected occurrence of an undesirable event like an asset failure—such as an increase in maintenance cost and/or a decrease in productivity—and may thus provide a positive net business value.

In general, an event prediction model for a given type of event may be configured to (i) evaluate the data values for a given set of input data variables that appear to be associated with event occurrences of the given type and then (ii) output a prediction of whether an event occurrence of the given type is forthcoming. Further, in practice, an event prediction model for a given type of event may be configured to output its prediction of a forthcoming event occurrence during a particular window of time preceding the event occurrence referred as an "event window," which is a window of time during which a preemptive prediction of an event occurrence of the given type is considered to provide sufficient net value. In this respect, the beginning of an event window for an event occurrence of the given type may be set to the earliest time (relative to the actual time of the forthcoming event occurrence) at which a preemptive notification of the event occurrence is still expected to provide sufficient net value (e.g., 1-2 weeks before the event occurrence), while the end of the event window for an event occurrence of the given type may be set to the latest time (relative to the actual time of the forthcoming event occurrence) at which a preemptive notification of the event occurrence is still expected to provide sufficient net value (e.g., 1-2 days before the event occurrence).

In view of the foregoing, it will be appreciated that the ability of an event prediction model to output accurate, timely predictions of forthcoming event occurrences of a given type depends in large part on the particular set of input data variables that the event prediction model uses to render those predictions. Indeed, in order for a given event prediction model to output an accurate, timely prediction of whether an event occurrence is forthcoming, the model's set of input data variables generally should be of a nature that the data values thereof, either alone as is, transformed, or in some combination with one another, exhibit some indication that an event occurrence event of the given type is forthcoming that can be deduced by the event prediction model (e.g., by changing in a particular way).

Therefore, one important aspect of creating an event prediction model for a given type of event is selecting the particular set of input data variables that the event prediction model uses to render its predictions. Indeed, it is usually counterproductive to train a model without performing some type of input variable selection, because there is typically a very large universe of possible input variables—many of which have little or no relevance to the model's prediction— and including these irrelevant (or marginally-relevant) variables may increase computational cost and/or degrade model performance.

When selecting the input data variables for an event prediction model, a primary goal is to identify data variables having values that provide an indication of an event occurrence of the given type sufficiently in advance of that event occurrence, such that the event prediction model can detect the indication and then begin outputting its prediction that the event occurrence is forthcoming. For example, data variables having values that meaningfully change in the window of time leading up to an event occurrence of the given type may be good candidates to include in the set of input data variables used by the event prediction model to render its predictions. On the other hand, data variables having values that do not appear to meaningfully change in the window of time leading up to an event occurrence of the given type may not be good candidates to include in the set of input data variables used by the event prediction model to render its predictions. Further, it is generally preferable for the chosen input variables to have causal relationships with the outcome, as opposed to just being correlated.

However, existing technology for creating an event prediction model tends to select the model's set of input data variables based heavily (if not exclusively) on input from a subject matter expert (SME) or the like, which has several limitations. For example, while an SME typically has knowledge regarding some possible causes of an event occurrence of a given type (e.g., an occurrence of a given failure mode), the SME is often incapable of identifying the entire universe of causes for an event occurrence of the given type, and also may be unable to identify the actual root cause of an event occurrence of the given type at a granular level. As another example, while an SME may be able to identify that a particular behavior of data variable is correlated to an event occurrence of a given type, the SME may be unable to identify the specific point in time at which the data variable's values are most likely to be indicative of an event occurrence of the given type. As yet another example, an SME is typically only focused a limited set of data variables that may be associated with event occurrences of the given type, rather than the much larger universe of data variables that are available to an asset data platform (including but not limited to data variables that are derived by the asset data platform based on raw data). As yet another example, an SME may have knowledge of how the asset works theoretically, but oftentimes the environment in which an asset operates changes its behavior, creating new failure modes that may be outside of the scope of an SME's knowledge. In this respect, the new behaviors may be such that an SME's knowledge may never be able to sufficiently account for that behavior. As a result of these limitations, the set of input data variables selected for an event prediction model often does not include the data variables that provide the best indication of a forthcoming event occurrence of the given type, which degrades the event prediction model's ability to provide accurate, timely predictions. Thus, there is a need for technology that helps create a more accurate event prediction model.

To address these and other problems with existing technology, disclosed herein is a new process for creating an event prediction model that employs a data-driven approach for selecting the model's set of input data variables. For purposes of illustration, the disclosed process is described herein as being carried out by a data analytics platform such as an asset data platform, but it should be understood that some or all of the functions of the disclosed process may be carried out by another entity as well.

According to an example embodiment, the disclosed new process for creating an event prediction model may begin with a data analytics platform receiving an initial set of parameters for the event prediction model to be created by the data analytics platform, which may include an identification of the type of event to be predicted by the event prediction model (e.g., a given failure mode for a particular class of assets) and perhaps also an indication of the event window to be used by the event prediction model. The data analytics platform may receive this initial set of parameters in various manners. As one example, the data analytics platform may receive the initial set of parameters from a user of the platform, who may input the initial set of parameters via a client station coupled to the data analytics platform or a user interface of the data analytics platform, among other possibilities.

Next, the data analytics platform may select an initial set of data variables to use for the event prediction model (e.g., based on user input). Generally, the initial set of data variables may comprise any data type from among the universe of data types available to the data analytics platform including, for instance, (i) one or more types of operating data received from an asset or assets, such as one or more types of sensor data collected by an asset, or one or more types of abnormal-conditions data, among other possible types of data collected by an asset; (ii) one or more types of operating data received from an operating data source; (iii) one or more types of maintenance data received from an asset maintenance data source; (iv) one or more types of data received from an environmental data source; (v) one or more types of user input data received from a client station; and/or (vi) one or more types of data that are derived based on the forgoing data types, such as roll-up data and/or features data.

Depending on the embodiment, the data analytics platform may select the initial set of data variables in various manners. As one possibility, the data analytics platform may select the initial set of data variables based on input from a user of the platform, who may input a selection of the initial set of data variables via a client station coupled to the data analytics platform or a user interface of the data analytics platform, among other possibilities. For instance, the data analytics platform may cause a client station to present a user with a list of data variables available to the data analytics platform that may possibly serve as input data variables for the event prediction model being created (e.g., data variables that have some possible association with the given type of event being predicted), and the user may then select the initial set of data types from this list, which may cause the client station to transmit this selection to the data analytics platform.

As another possibility, the data analytics platform may select the initial set of data variables based on something other than user input. For example, the data analytics platform may refer to an existing event prediction model that shares similarities with the event prediction model being created (e.g., an existing event prediction model for a comparable type of event that occurs in another industry) and then select the initial set of data variables to be the same as or similar to the input data variables used by that existing event prediction model. As another example, the data analytics platform may maintain or have access to a data table that correlates event types with data variables known to be associated with those event types, in which case the data analytics platform may select the initial set of data variables based on such a data table.

The data analytics platform may select the initial set of data variables in other manners as well, including the possibility that the data analytics platform may select the initial set of data variables using a combination of the techniques described above.

After the initial set of data variables have been selected, the data analytics platform may then optionally classify each respective data variable in the initial set of data variables. Classifying the data variables in the initial set of data variables may help drive some of the later steps in the process. For instance, as will be described further herein, some steps of the disclosed process may involve using the classification of a given data variable as a basis to take one or more actions with respect to the given data variable.

In one implementation, the data analytics platform may classify each respective data variable in the initial set of data variables based on some predetermined data indicative of a respective classification for the respective data variable. Depending on the embodiment, this predetermined data may take the form of two or more possible classifications with the data analytics platform determining, for each respective data variable in the set of initial data variables, which of the two or more possible classifications to use for the respective data variable. In another embodiment, this predetermined data may take the form of a hierarchy of possible classifications with multiple levels of classification granularity. In this embodiment, the data analytics platform may determine, for each respective data variable in the set of initial data variables, which classification or classifications from the hierarchy to use for the respective data variable.

In one real-world example of this, the data analytics platform may classify respective data variables according to whether a respective data variable is a "continuous" data variable or a "categorical" data variable. A continuous data variable is a data variable that can have a data value that exists in a continuous range of values. Engine temperature is one example of a data variable that may be classified as continuous because the value of the engine temperature variable can exist as any value in a range of between a low bound of, say, 0° C. and a high bound of, say, 600° C. Battery voltage is another example of a data variable that may be classified as continuous because the value of the battery voltage variable can exist as any value in a range of values between a low bound of, say, 0V and a high bound of, say, 18V. On the other hand, a categorical data variable is a data variable that typically takes on one of a few possible discrete values or states. A data variable indicating the presence or absence of a specific fault condition at an asset is one example of a categorical data variable because the data variable takes on either one of two discrete states: an "affirmative" or "1" indicating, for instance, the presence of a fault condition, or a "negative" or "0" indicating, for instance, the absence of a fault condition. As mentioned, in some embodiments, the data analytics platform may further classify each data variable on a more granular level, in which the data analytics platform may refer to a known hierarchy of data variable classifications in order to further classify the continuous data variables into one or more possible sub-classifications and to further classify the categorical data variables into one or more sub-classifications.

After the initial set of data variables have been selected and optionally categorized, the data analytics platform may evaluate the extent to which each respective data variable in the initial set of data variables tends to be predictive of an event occurrence of the given type, and based on this evaluation, assign to each such data variable a respective metric (referred to herein as a "difference metric") that reflects this predictive tendency. These functions of evaluating and assigning respective difference metrics to the initial set of data variables (which may be referred to collectively as "scoring" the initial set of data variables) may take various forms.

As one possibility, the data analytics platform may begin by obtaining historical data values for the initial set of data variables, which may include both (i) historical data values from times that are outside of any event window for any actual event occurrence and (ii) historical data values from times that are inside an event window for an actual event occurrence. Then, for each respective data variable in the initial set of data variables, the data analytics platform may (a) compare the historical data values of the respective data variable that fall outside the model's event window to the historical data values of the respective data variable that fall inside the model's event window, and (b) based on this comparison, may derive a respective difference metric that represents the extent to which the historical data values of the respective data variable changed from outside the event window to inside the event window. In this respect, it should be appreciated that a data variable having a relatively high difference metric indicates that the values of the data variable tended to meaningfully change in the window of time leading up to an event occurrence of the given type, which suggests that the data variable may be more predictive of event occurrences of the given type. On the other hand, it should be appreciated that a data variable having a relatively low difference metric indicates that the values of the data variable tended not to meaningfully change in the window of the time leading up to an event occurrence of the given type, which suggests that the data variable may not be particularly predictive of event occurrences of the given type.

In accordance with the present disclosure, the data analytics platform may also employ different techniques to evaluate and assign the respective difference metrics to the initial set of data variables depending on the classification of the data variables. As one example to illustrate, the data analytics platform may employ different techniques to evaluate and assign the respective difference metrics to continuous data variables versus categorical data variables. Other examples are possible as well.

After scoring the initial set of data variables, the data analytics platform may next filter the initial set of data variables based on their respective difference metrics to thereby arrive at a filtered, initial set of data variables that appear to be most predictive of event occurrences of the given type. This filtering function may take various forms.

As one possibility, the data analytics platform may filter the initial set of data variables by comparing their respective difference metrics to a threshold difference metric (e.g., 0.5) and then selecting the data variables in the initial set having difference metrics that are greater than or equal to this threshold difference metric. As another possibility, the data analytics platform may filter the data variables in the initial set of data variables by sorting the initial set of data variables based on their respective difference metrics and then selecting a given number of the initial data variables that have the highest difference metrics (e.g., the top three or top five data variables in the sorted initial set of data variables).

After filtering the initial set of data variables based on their respective difference metrics, the data analytics platform may apply a respective set of one or more transformations to each respective data variable in the filtered, initial set of data variables (or at least each of a subset of the filtered, initial set of data variables) to thereby arrive at a transformed set of data variables. In general, a transformation is any qualitative or quantitative manipulation to at least one data variable's values such that, once transformed, the transformed data variable represents the at least one data variable's values in a different way. Examples of possible transformations of a given data variable include the average of the given data variable's over a time period, the rate of change of the given data variable's values over a time period, the logarithm of the given data variable's values, and the variance of the given data variable's values, among others. To illustrate with a real-world example, if the initial data variable is engine temperature, one possible transformation of the engine temperature may be average engine temperature on a week-by-week basis.

In practice, the data analytics platform may select the respective set of one or more transformations to apply to each respective data variable in the filtered, initial set of data variables based on various factors.

As a first possibility, the data analytics platform may select the respective set of one or more transformations to apply to a respective data variable in the filtered, initial set of data variables based on the classification of the respective data variable. For instance, each possible classification may have a corresponding set of one or more transformations associated therewith. Thus, when selecting the respective set of one or more transformations to apply to a respective data variable, the data analytics platform may (i) identify the classification of the respective data variable, (ii) identify the set of one or more transformations associated with the identified classification, and (iii) include the identified set of one or more transformations in the respective set of one or more transformations to apply to the respective data variable.

As a second possibility, the data analytics platform may select the respective set of one or more transformations to apply to a respective data variable in the filtered, initial set of data variables based on data indicating the expected behavior of the respective data variable for the given type of event to be predicted by the event prediction model being created. For instance, the data analytics platform may maintain or have access to data indicating that certain data variables are expected to behave a certain way in the window of time preceding an event occurrence of the given type, examples of which may include data indicating that engine temperature is expected to rise dramatically prior to an engine failure and/or that engine oil viscosity is expected to drop dramatically prior to an engine failure. Thus, the data analytics platform may take this expected behavior into account when selecting the respective sets of one or more transformations for these data variables, such that the one or more transformations selected for each data variable is more tailored to the expected behavior of that variable.

As a third possibility, the data analytics platform may select the respective set of one or more transformations to apply to a respective data variable in the filtered, initial set of data variables based on an evaluation of an existing event prediction model that shares similarities with the event prediction model being created (e.g., an existing event prediction model for a similar type of event that occurs in another industry). For instance, if there is existing event prediction model that shares similarities with the event prediction model being created, the data analytics platform may evaluate the input data variables for that existing event prediction model to identify any data variable that appears to be a transformed version of a data variable included in the filtered, initial set of data variables. If so, the data analytics platform may then select a transformation that causes the same transformed data variable to be included in the transformed set of data variables for the event prediction model being created.

The data analytics platform may select the respective set of one or more transformations to apply to each respective data variable in the filtered, initial set of data variables in various other manners as well—including the possibility that the data analytics platform may select the respective set of one or more transformations to apply to each respective data variable in the filtered, initial set of data variables based on a combination of two or more of the foregoing factors.

In some embodiments, in addition to applying a respective set of one or more transformations to each respective data variable in the filtered, initial set of data variables in order to produce the transformed set of data variables, the data analytics platform may also "pass through" one or more of the data variables in the filtered, initial set of data variables, such that the one or more passed-through data variables are included in the transformed set of data variables as well. In this respect, the data analytics platform may decide whether to "pass through" a respective data variable in the filtered, initial set of data variables based on any of various factors, including but not limited to the factors discussed above (e.g., the classification of the respective data variable, the expected behavior of the respective data variable, and/or whether the respective data variable is included as an input data variable for a comparable event prediction model).

After defining the transformed set of data variables, the data analytics platform may optionally classify each respective data variable in the transformed set of data variables in a manner similar to that described above for the initial set of data variables.

In turn, the data analytics platform may evaluate the extent to which each data variable in the transformed set of data variables tends to be predictive of an event occurrence of the given type, and based on this evaluation, assign to each such data variable a respective difference metric that reflects this predictive tendency. These functions of evaluating and assigning respective difference metrics to the transformed set of data variables (which may be referred to collectively as "scoring" the transformed set of data variables) may be carried out in a similar manner to the above-described functions of evaluating and assigning respective difference metrics to the initial set of data variables.

For instance, the data analytics platform may begin by obtaining historical values for the transformed set of data variables, which may include both (i) historical data values from times that are outside of any event window for any actual event occurrence and (ii) historical data values from times that are inside an event window for an actual event occurrence. In this respect, obtaining the historical values for the transformed set of data variables may involve deriving such values based on the historical values of the initial set of data variables. Then, for each respective data variable in the transformed set of data variables, the data analytics platform may (a) compare the historical data values of the respective data variable that fall outside the model's event window to the historical data values of the respective data variable that fall inside the event window, and (b) based on this comparison, derive a respective difference metric that represents the extent to which the historical data values of the respective data variable changed from outside the event window to inside the event window. In this respect, as above, the particular technique to evaluate and assign the respective difference metrics to the respective data variables in the transformed set of data variables may vary depending on the classification of the respective data variables.

After scoring the transformed set of data variables, the data analytics platform may next filter the transformed set of data variables based on their respective different metrics to thereby arrive at a filtered, transformed set of data variables that appear to be most predictive of event occurrences of the given type. This filtering function may be carried out in a similar manner to the above-described function of filtering the initial set of data variables (e.g., by applying threshold difference metric or selecting a given number of data variables having the highest difference metrics).

After filtering the transformed set of data variables, the data analytics platform may then proceed in one of two manners. As one option, the data analytics platform may decide to conclude the input-variable-selection process, select the filtered, transformed set of data variables as the set of input variables for the event creation model, and proceed to the next phase of the process for creating the event prediction model (e.g., by evaluating historical data for the set of input variables using a machine learning technique). Alternatively, as another option, the data analytics platform may decide to continue with the input-variable-selection process by applying another round of transformations to the filtered, transformed set of data variables—which may produce a second transformed set of data variables—and then optionally classifying, scoring, and filtering the second transformed set of data variables in order to produce a filtered, second transformed set of data variables.

Advantageously, the disclosed process for creating event prediction models improves upon the existing technology for creating event prediction models, which suffers from all of the problems discussed above. For example, unlike the existing technology for creating event prediction models, the disclosed process utilizes an iterative, data-driven approach for selecting the particular set of input data variables to use in an event prediction model, which may produce an event prediction model that renders more accurate, timely predictions. As another example, the disclosed approach may leverage knowledge regarding the classification of data variables (e.g., as embodied in a data-variable hierarchy) to help improve the iterative, data-driven approach for selecting the particular set of input data variables to use in an event prediction model. As yet another example, the disclosed approach may leverage knowledge regarding existing event prediction models to help improve the iterative, data-driven approach for selecting the particular set of input data variables to use in an event prediction model. The disclosed process provides several other improvements over existing technology as well.

Accordingly, in one aspect, disclosed herein is a method that involves (a) selecting an initial set of data variables to consider for use as input variables of a given event prediction model that is to predict event occurrences of a given type, (b) for each respective data variable in the initial set of data variables, (i) obtaining a respective set of historical data values of the respective data variable that includes a first subset of historical data values from times that are outside of any event window for any actual event occurrence and a second subset of historical data values from times that are inside an event window for an actual event occurrence, and (ii) determining a respective difference metric that indicates an extent to which the first subset of historical data values differ from the second subset of historical data values, (c) based on the respective difference metrics for the initial set of data variables, filtering the initial set of data variables down to a filtered, initial set of data variables, (d) applying a respective set of one or more transformations to each of at least two data variables in filtered, initial set of data variables and thereby defining a transformed set of data variables, (e) for each respective data variable in the transformed set of data variables, (i) obtaining a respective set of historical data values of the respective data variable that includes a first subset of historical data values from times that are outside of any event window for any actual event occurrence and a second subset of historical data values from times that are inside an event window for an actual event occurrence, and (ii) determining a respective difference metric that indicates an extent to which the first subset of historical data values differ from the second subset of historical data values, (f) based on the respective difference metrics for the transformed set of data variables, filtering the transformed set of data variables down to a filtered, transformed set of data variables, and (g) using the filtered, transformed set of data variables as a basis for selecting the input variables of the event prediction model.

In another aspect, disclosed herein is a computing system that includes a network interface, at least one processor, a non-transitory computer-readable medium, and program instructions stored on the non-transitory computer-readable medium that are executable by the at least one processor to cause the computing system to carry out the functions disclosed herein, including but not limited to the functions of the foregoing method.

In yet another aspect, disclosed herein is a non-transitory computer-readable storage medium provisioned with software that is executable to cause a computing system to carry out the functions disclosed herein, including but not limited to the functions of the foregoing method.

One of ordinary skill in the art will appreciate these as well as numerous other aspects in reading the following disclosure.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE NETWORK CONFIGURATION

Figure 1:
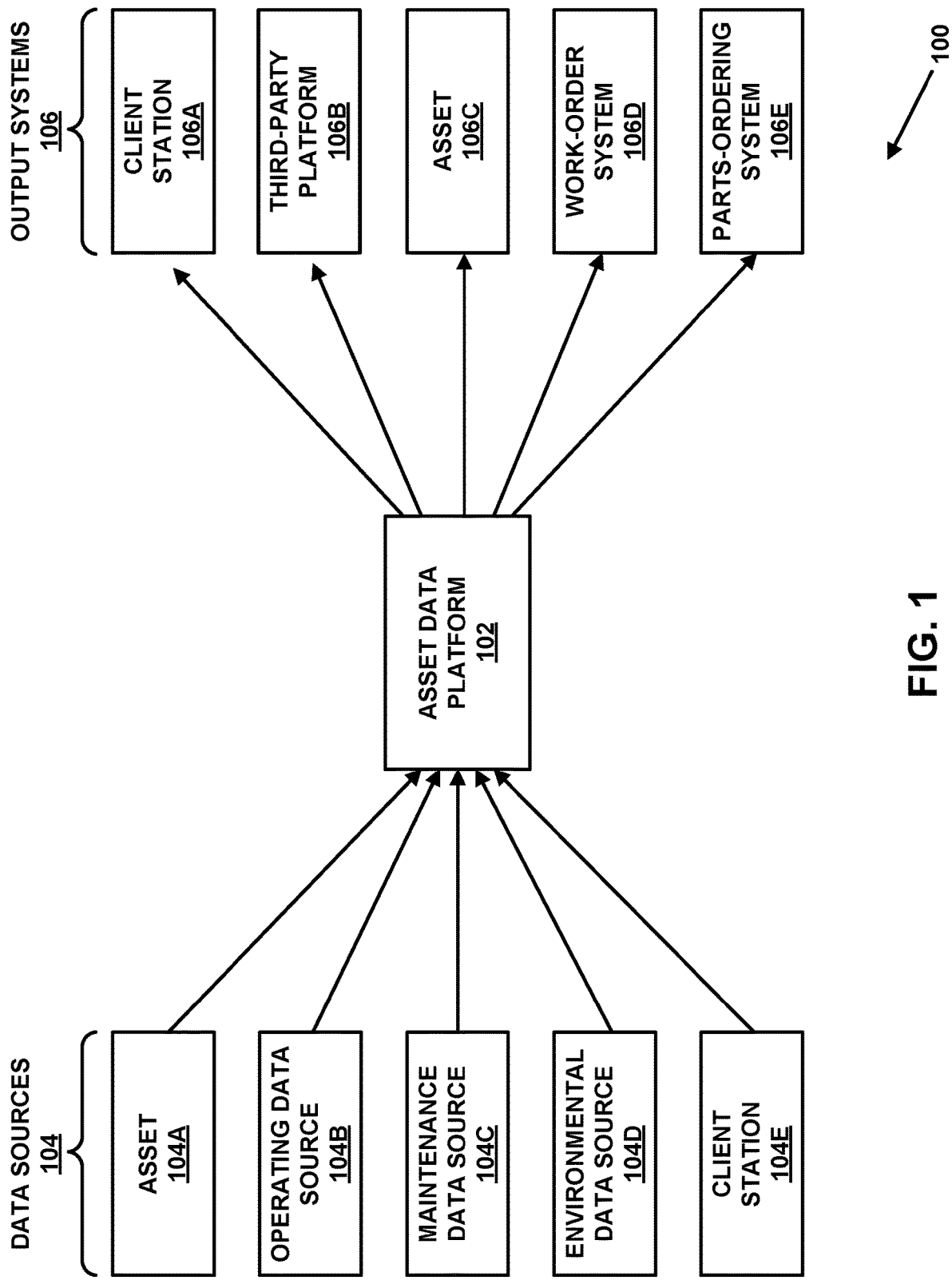
FIG. 1 depicts an example network configuration in which example embodiments may be implemented.

Turning now to the figures, FIG. 1 depicts an example network configuration 100 in which example embodiments may be implemented. As shown, network configuration 100 includes at its core a central computing system 102, which may be communicatively coupled to one or more data sources 104 and one or more output systems 106 via respective communication paths. In such an arrangement, central computing system 102 may generally serve as an "asset data platform" that is configured to perform functions to facilitate the monitoring, analysis, and/or management of various types of "assets," which may take various forms.

For instance, some representative types of assets that may be monitored by asset data platform 102 may include transport vehicles (e.g., locomotives, aircrafts, passenger vehicles, trucks, ships, etc.), equipment for construction, mining, farming, or the like (e.g., excavators, bulldozers, dump trucks, earth movers, etc.), manufacturing equipment (e.g., robotics devices, conveyor systems, and/or other assembly-line machines), electric power generation equipment (e.g., wind turbines, gas turbines, coal boilers), petroleum production equipment (e.g., gas compressors, distillation columns, pipelines), and data network nodes (e.g., personal computers, routers, bridges, gateways, switches, etc.), among other examples. Additionally, an asset may have various other characteristics that more specifically define the type of asset, examples of which may include the asset's brand, make, model, vintage, and/or software version, among other possibilities. In this respect, depending on the implementation, the assets monitored by asset data platform 102 may either be of the same type or various different types. Additionally yet, the assets monitored by asset data platform 102 may be arranged into one or more "fleets" of assets, which refers to any group or two or more assets that are related to one another in some manner (regardless of whether such assets are of the same type).

Broadly speaking, asset data platform 102 may comprise one or more computing systems that have been provisioned with software for carrying out one or more of the platform functions disclosed herein, including but not limited to receiving data related to the operation and/or management of assets (broadly referred to herein as "asset-related data") from data sources 104, performing data ingestion and/or data analytics operations on the asset-related data received from asset data sources 104, and then outputting data and/or instructions related to the operation and/or management of assets to output systems 106. The one or more computing systems of asset data platform 102 may take various forms and be arranged in various manners.

For instance, as one possibility, asset data platform 102 may comprise computing infrastructure of a public, private, and/or hybrid cloud (e.g., computing and/or storage clusters) that has been provisioned with software for carrying out one or more of the platform functions disclosed herein. In this respect, the entity that owns and operates asset data platform 102 may either supply its own cloud infrastructure or may obtain the cloud infrastructure from a third-party provider of "on demand" computing resources, such include Amazon Web Services (AWS), Microsoft Azure, Google Cloud, Alibaba Cloud, or the like. As another possibility, asset data platform 102 may comprise one or more dedicated servers that have been provisioned with software for carrying out one or more of the platform functions disclosed herein. Other implementations of asset data platform 102 are possible as well.

Further, in practice, the software for carrying out the disclosed platform functions may take various forms. As one possibility, the platform software may comprise executable program instructions that cause asset data platform 102 to perform data ingestion operations on asset-related data received from data sources 104, including but not limited to extraction, transformation, and loading operations, among other examples. As another possibility, the platform software may comprise executable program instructions that cause asset data platform 102 to perform data analytics operations based on the asset-related data received from data sources 104, including but not limited to failure prediction, anomaly detection, fuel management, noise filtering, image analysis, predictive recommendations, and label correction, among other examples. As yet another possibility, the platform software may comprise executable program instructions that cause asset data platform 102 to output data and/or instructions related to the operation and/or management of assets for receipt by one or more output systems 106.

As one specific example, the platform software may comprise executable program instructions for outputting data related to the operation and/or management of assets that is to be presented to a user (e.g., asset-related data received from data sources 104 and/or the results of the data analytics operations performed by asset data platform 102), and these program instructions may take the form of discrete "applications" that are each tailored for particular end users, particular groups of assets, and/or particular purposes. Some representative examples of such applications may include an asset performance management application, an asset fleet management application, a service optimization application, and an asset dealer operations application, among other possibilities.

The software for carrying out the disclosed platform functions may take various other forms as well.

As described above, asset data platform 102 may be configured to receive asset-related data from one or more data sources 104. These data sources—and the asset-related data output by such data sources—may take various forms. To illustrate, FIG. 1 shows some representative examples of data sources 104 that may provide asset-related data to asset data platform 102, which are discussed in further detail below. However, it should be understood that these example data sources are merely provided for purposes of illustration, and that asset data platform 102 may be configured to receive asset-related data from other types of data sources as well.

For instance, one type of data source 104 may take the form of an asset 104A, which may be equipped with components that are configured to capture data that is indicative of the operation of the asset—referred to herein as "operating data"—and then transmit the asset's operating data to asset data platform 102 over the respective communication path between asset 104A and asset data platform 102. In this respect, asset 104A may take any of the various forms described above, including but not limited to a transport vehicle, heavy equipment, manufacturing equipment, electric power generation equipment, and/or petroleum production equipment, among other types of assets. Further, it should be understood that the components of asset 104A for capturing and transmitting the asset's operating data either may be included as part of asset 104A as manufactured or may be affixed to asset 104A at some later date, among other possibilities.

The operating data that is captured and sent by asset 104A may take various forms. As one possibility, an asset's operating data may include sensor data that comprises time-series measurements for certain operating parameters of the asset, examples of which may include speed, velocity, acceleration, location, weight, temperature, pressure, friction, vibration, power usage, throttle position, fluid usage, fluid level, voltage, current, magnetic field, electric field, presence or absence of objects, current position of a component, and power generation, among many others. As another possibility, an asset's operating data may include abnormal-conditions data that indicates occurrences of discrete abnormal conditions at the asset, examples of which include fault codes that indicate the occurrence of certain faults at the asset (e.g., when an operating parameter exceeds a threshold), asset shutdown indicators, and/or other types of abnormal-condition indicators. As yet another possibility, an asset's operating data may include data that has been derived from the asset's sensor data and/or abnormal-conditions data, examples of which may include "roll-up" data (e.g., an average, mean, median, etc. of the raw measurements for an operating parameter over a given time window) and "features" data (e.g., data values that are derived based on the raw measurements of two or more of the asset's operating parameters). An asset's operating data may take various other forms as well.

In practice, an asset's operating data may also include or be associated with data that identifies the origin of the operating data. This origin data may take various forms. For example, such origin data may include identifying information for the originating asset (e.g., an asset ID and/or data indicating the asset's type, brand, make, model, age, software version, etc.) and/or identifying information for the component of asset 104A that captured the operating data (e.g., a sensor ID), among other possibilities. As another example, such origin data may include data indicating the time at which the operating data was captured (e.g., a timestamp) and/or the asset's location when the operating data was captured (e.g., GPS coordinates), to the extent that such location is not otherwise included in the operating data. Asset data platform 102 may receive other types of data from asset 104A as well.

Further, asset data platform 102 may be configured to receive operating data from asset 104A in various manners. As one possibility, asset 104A may be configured to send its operating data to asset data platform 102 in a batch fashion, in which case asset data platform 102 may receive periodic transmissions of operating data from asset 104A (e.g., on an hourly, daily, or weekly basis). As another possibility, asset data platform 102 may receive operating data from asset 104A in a streaming fashion as such operating data is captured by asset 104A. As yet another possibility, asset data platform 102 may receive operating data from asset 104A in response to sending a request for such data to asset 104A, in which case asset data platform 102 may be configured to periodically send requests for operating data to asset 104A. Asset data platform 102 may be configured to receive operating data from asset 104A in other manners as well.

Another type of data source 104 may take the form of operating data source 104B, which may comprise a computing system that is configured to receive operating data from one or more upstream sources of operating data (e.g., assets) and then provide this operating data to asset data platform 102 over the respective communication path between operating data source 104B and asset data platform 102. Such an operating data source may take various forms. As one possibility, operating data source 104B may comprise an existing data platform of a third-party organization that receives and/or maintains operating data for one or more assets, such as a data platform operated by an asset owner, an asset dealer, an asset manufacturer, an asset repair shop, or the like. As another possibility, operating data source 104B may comprise an intermediary system that compiles operating data from a plurality of upstream sources of operating data and then provides that compiled operating data to asset data platform 102. For example, such an intermediary system may take the form of a computing system located in proximity to a fleet of assets (e.g., at a job site or wind farm) that is configured to compile operating data for the fleet of assets or a computing system that is configured to compile operating data maintained by several third-party data platforms, among other possibilities. Operating data source 104B may take other forms as well.

The operating data that is maintained and sent by operating data source 104B may take various forms, including but not limited to any of the forms described above. In addition to the operating data received from the one or more upstream sources, the operating data provided by operating data source 104B may also include additional operating data that is generated by operating data source 104B itself, such as operating data that operating data sources 104B derives based on the operating data received from the one or more upstream sources (e.g., abnormal-conditions data, roll-up data, features data, etc.).

Further, as with asset 104A, asset data platform 102 may be configured to receive operating data from operating data source 104B in various manners. As one possibility, operating data source 104B may be configured to send its operating data to asset data platform 102 in a batch fashion, in which case asset data platform 102 may receive periodic transmissions of operating data from operating data source 104B (e.g., on an hourly, daily, or weekly basis). As another possibility, asset data platform 102 may receive operating data from operating data source 104B in a streaming fashion as such operating data is received and/or otherwise generated by operating data source 104B. As yet another possibility, asset data platform 102 may receive operating data from operating data source 104B in response to sending a request for such data to operating data source 104B, in which case asset data platform 102 may be configured to periodically send requests for operating data to operating data source 104B. As still another possibility, asset data platform 102 may receive operating data from operating data source 104B by accessing an Application Programming Interface (API) that has been made available by operating data source 104B, subscribing to a service provided by operating data source 104B, or the like. Asset data platform 102 may be configured to receive operating data from operating data source 104B in other manners as well.

Yet another type of data source 104 may take the form of an asset maintenance data source 104C, which may comprise a computing system that is configured to generate and/or receive data related to the maintenance of a plurality of assets—referred to herein as "maintenance data"—and then send this maintenance data to asset data platform 102 over the respective communication path between asset maintenance data source 104C and asset data platform 102. In this respect, asset maintenance data source 104C may take various forms. As one possibility, asset maintenance data source 104C may comprise an existing data platform of a third-party organization that is interested in tracking the maintenance of assets, such as an asset owner, asset dealer, asset manufacturer, asset repair shop, or the like. As another possibility, asset maintenance data source 104C may comprise an intermediary system that compiles asset maintenance data from multiple upstream sources (e.g., multiple repair shops) and then provides that compiled maintenance data to asset data platform 102. Asset maintenance data source 104C may take other forms as well.

The asset maintenance data that is maintained and sent by asset maintenance data source 104C may take various forms. As one example, the asset maintenance data may include details regarding inspections, maintenance, servicing, and/or repairs that have been performed or are scheduled to be performed on assets (e.g., work order data). As another example, the asset maintenance data may include details regarding known occurrences of failures at assets (e.g., date of failure occurrence, type of failure occurrence, etc.). Other examples are possible as well. As with the operating data, the asset maintenance data may also include or be associated with data indicating the origins of the asset maintenance data (e.g., source identifier, timestamp, etc.).

Further, asset data platform 102 may be configured to receive operating data from asset maintenance data source 104C in various manners, including but not limited to any of the manners discussed above with respect to operating data source 104B.

Still another type of data source 104 may take the form of environmental data source 104D, which may comprise a computing system that is configured to generate and/or receive data about an environment in which assets operate—referred to herein as "environmental data"—and then send this data to asset data platform 102 over the respective communication path between environmental data source 104D and asset data platform 102. In this respect, environmental data source 104D— and the environmental data provided thereby—may take various forms.

As one possibility, environmental data source 104D may take the form of a weather data source that provides information regarding the weather at locations where assets operate (e.g., ambient temperature, air pressure, humidity, wind direction, wind speed, etc.). As another possibility, environmental data source 104D may take the form of a geospatial data source that provides information regarding the geography and/or topology at locations where assets operate. As yet another possibility, environmental data source 104D may take the form of a satellite image data source that provides satellite imagery for locations where assets operate. As still another possibility, environmental data source 104D may take the form of a traffic data source that provides information regarding ground, air, and/or water traffic at locations where assets operate. Environmental data source 104D may take other forms as well.

Further, in practice, asset data platform 102 may be configured to receive operating data from asset environmental data source 104D in various manners, including but not limited to any of the manners discussed above with respect to operating data source 104B.

Another type of data source 104 may take the form of client station 104E, which may comprise any computing device that is configured to receive user input related to the operation and/or management of assets (e.g., information entered by a fleet operator, a repair technician, or the like) and then send that user input to asset data platform 102 over the respective communication path between client station 104E and asset data platform 102. In this respect, client station 104E may take any of various forms, examples of which may include a desktop computer, a laptop, a netbook, a tablet, a smartphone, and/or a personal digital assistant (PDA), among other possibilities.

The user input that is entered into client station 104E and sent to asset data platform 102 may comprise various different kinds of information, including but not limited to the kinds of information discussed above with respect to the other data sources. For instance, as one possibility, the user input may include certain kinds of operating data, maintenance data, and/or environmental data that may be input into asset data platform 102 by a user rather than being received from one of the aforementioned data sources. As another possibility, the user input may include certain user-defined settings or logic that is to be used by asset data platform 102 when performing data ingestion and/or data analytics operations. The user input that is entered into client station 104E and sent to asset data platform 102 may take various other forms as well.

The aforementioned data sources 104 are merely provided for purposes of illustration, and it should be understood that the asset data platform's data sources may take various other forms as well. For instance, while FIG. 1 shows several different types of data sources 104, it should be understood that asset data platform 102 need not be configured to receive asset-related data from all of these different types of data sources, and in fact, asset data platform 102 could be configured to receive asset-related data from as little as a single data source 104. Further, while data sources 104A-E have been shown and described separately, it should be understood that these data sources may be combined together as part of the same physical computing system (e.g., an organization's existing data platform may serve as both operating data source 104B and maintenance data source 104C). Further yet, it should be understood that asset data platform 102 may be configured to receive other types of data related to the operation and/or management of assets as well, examples of which may include asset management data (e.g., route schedules and/or operational plans), enterprise data (e.g., point-of-sale (POS) data, customer relationship management (CRM) data, enterprise resource planning (ERP) data, etc.), and/or financial markets data, among other possibilities.

As shown in FIG. 1, asset data platform 102 may also be configured to output asset-related data and/or instructions for receipt by one or more output systems 106. These output systems—and the data and/or instructions provided to such output systems—may take various forms. To illustrate, FIG. 1 shows some representative examples of output systems 106 that may receive asset-related data and/or instructions from asset data platform 102, which are discussed in further detail below. However, it should be understood that these example output systems are merely provided for purposes of illustration, and that asset data platform 102 may be configured to output asset-related data and/or instructions to other types of output systems as well.

For instance, one type of output system 106 may take the form of client station 106A, which may comprise any computing device that is configured to receive asset-related data from asset data platform 102 over the respective communication path between client station 106A and asset data platform 102 and then present such data to a user (e.g., via a front-end application that is defined by asset data platform 102). In this respect, client station 106A may take any of various forms, examples of which may include a desktop computer, a laptop, a netbook, a tablet, a smartphone, and/or a PDA, among other possibilities. Further, it should be understood that client station 106A could either be a different device than client station 104E or could be the same device as client station 104E.

The asset-related data that is output for receipt by client station 106A may take various forms. As one example, this asset-related data may include a restructured version of asset-related data that was received by asset data platform 102 from one or more data sources 104 (e.g., operating data, maintenance data, etc.). As another example, this asset-related data may include data that is generated by asset data platform 102 based on the asset-related data received from data sources 104, such as data resulting from the data analytics operations performed by asset data platform 102 (e.g., predicted failures, recommendations, alerts, etc.). Other examples are possible as well.

Along with the asset-related data that is output for receipt by client station 106A, asset data platform 102 may also output associated data and/or instructions that define the visual appearance of a front-end application (e.g., a graphical user interface (GUI)) through which the asset-related data is to be presented on client station 106A. Such data and/or instructions for defining the visual appearance of a front-end application may take various forms, examples of which may include Hypertext Markup Language (HTML), Cascading Style Sheets (CSS), and/or JavaScript, among other possibilities. However, depending on the circumstance, it is also possible that asset data platform 102 may output asset-related data to client station 106A without any associated data and/or instructions for defining the visual appearance of a front-end application.

Further, client station 106A may receive asset-related data from asset data platform 102 in various manners. As one possibility, client station 106A may send a request to asset data platform 102 for certain asset-related data and/or a certain front-end application, and client station 106A may then receive asset-related data in response to such a request. As another possibility, asset data platform 102 may be configured to "push" certain types of asset-related data to client station 106A, such as scheduled or event-based alerts, in which case client station 106A may receive asset-related data from asset data platform 102 in this manner. As yet another possibility, asset data platform 102 may be configured to make certain types of asset-related data available via an API, a service, or the like, in which case client station 106A may receive asset-related data from asset data platform 102 by accessing such an API or subscribing to such a service. Client station 106A may receive asset-related data from asset data platform 102 in other manners as well.

Another type of output system 106 may take the form of a data platform 106B operated by a third-party organization that may be interested in the operation and/or management of assets, such as an asset owner, an asset dealer, an asset manufacturer, an asset repair shop, or the like. For instance, a third-party organization such as this may have its own data platform 106B that already enables users to access and/or interact with asset-related data through front-end applications that have been created by the third-party organization, but data platform 106B may not be programmed with the capability to ingest certain types of asset-related data or perform certain types of data analytics operations. In such a scenario, asset data platform 102 may be configured to output certain asset-related data for receipt by data platform 106B.

The asset-related data that is output for receipt by data platform 106B may take various forms, including but not limited any of the forms described above in connection with the output to client station 106A. However, unlike for client station 104A, the asset-related data that is output for receipt by data platform 106B typically need not include any associated data and/or instructions for defining the visual appearance of a front-end application, because data platform 106B may be performing operations on the asset-related data from asset data platform 102 beyond presenting it to a user via a front-end application.

Further, data platform 106B may receive asset-related data from asset data platform 102 in various manners, including but not limited to any of the manners discussed above with respect to client station 106A (e.g., by sending a request to asset data platform 102, having data "pushed" by asset data platform, or accessing an API or service provided by asset data platform 102).

Yet another type of output system 106 may take the form of asset 106C, which may be equipped with components that are configured to receive asset-related data and/or instructions from asset data platform 102 and then act in accordance with the received data and/or instructions. In this respect, asset 106C may take any of the various forms described above, including but not limited to a transport vehicle, heavy equipment, manufacturing equipment, electric power generation equipment, and/or petroleum production equipment, among other types of assets. Further, it should be understood that asset 106C could either be a different asset than asset 104A or could be the same asset as asset 104A.

The asset-related data and/or instructions that are output for receipt by asset 106C may take various forms. As one example, asset data platform 102 may be configured to send asset 106C certain data that has been generated by asset data platform 102 based on the asset-related data received from data sources 104, such as data resulting from a data analytics operation performed by asset data platform 102 (e.g., predicted failures, recommendations, alerts, etc.), in which case asset 106C may receive this data and then potentially adjust its operation in some way based on the received data. As another example, asset data platform 102 may be configured to generate and send an instruction for asset 106C to adjust its operation in some way (e.g., based on the asset-related data received from data sources 104), in which case asset 106C may receive this instruction and then potentially adjust its operation in accordance with the instruction. As yet another example, asset data platform 102 may be configured to generate and send an instruction for asset 106C to perform a data analytics operation locally at asset 106C, in which case asset 106C may receive the instruction and then locally perform the data analytics operation. In some cases, in conjunction with sending asset 106C an instruction to perform a data analytics operation, asset data platform 102 may also provide asset 106C with executable program instructions and/or program data that enable asset 106C to perform the data analytics operation (e.g., a predictive model). However, in other cases, asset 106C may already be provisioned with executable program instructions for performing the data analytics operation. Other examples are possible as well.

Further, in practice, asset 106C may receive asset-related data and/or instructions from asset data platform 102 in various manners, including but not limited to any of the manners discussed above with respect to client station 106A.

Still another type of output system 106 may take the form of work-order system 106D, which may comprise a computing system that is configured to receive asset-related data and/or instructions from asset data platform 102 over the respective communication path between work-order system 106D and asset data platform 102 and then generate a work order in accordance with the received data and/or instructions.

A further type of output system 106 may take the form of parts-ordering system 106E, which may comprise a computing system that is configured to receive asset-related data and/or instructions from asset data platform 102 over the respective communication path between parts-ordering system 106E and asset data platform 102 and then generate a parts order in accordance with the received data and/or instructions.

The aforementioned output systems 106 are merely provided for purposes of illustration, and it should be understood that output systems in communication with asset data platform 102 may take various other forms as well. For instance, while FIG. 1 shows several different types of output systems 106, it should be understood that asset data platform 102 need not be configured to output asset-related data and/or instructions for receipt by all of these different types of output systems, and in fact, asset data platform 102 could be configured to asset-related data and/or instructions for receipt by as little as a single output system 106. Further, while output systems 106A-E have been shown and described separately, it should be understood that these output systems may be combined together as part of the same physical computing system. Further yet, it should be understood that asset data platform 102 may be configured to output asset-related data and/or instructions for receipt by other types of output systems as well.

As discussed above, asset data platform 102 may communicate with the one or more data sources 104 and one or more output systems 106 over respective communication paths. Each of these communication paths may generally comprise one or more communication networks and/or communications links, which may take any of various forms. For instance, each respective communication path with asset data platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with asset data platform 102 may be wireless, wired, or some combination thereof, and may carry data according to any of various different communication protocols.

Although not shown, the respective communication paths with asset data platform 102 may also include one or more intermediate systems. For example, it is possible that a given data source 104 may send asset-related data to one or more intermediary systems, such as an aggregation system, and asset data platform 102 may then be configured to receive the asset-related data from the one or more intermediary systems. As another example, it is possible that asset data platform 102 may communicate with a given output system 106 via one or more intermediary systems, such as a host server (not shown). Many other configurations are also possible.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE PLATFORM

Figure 2:
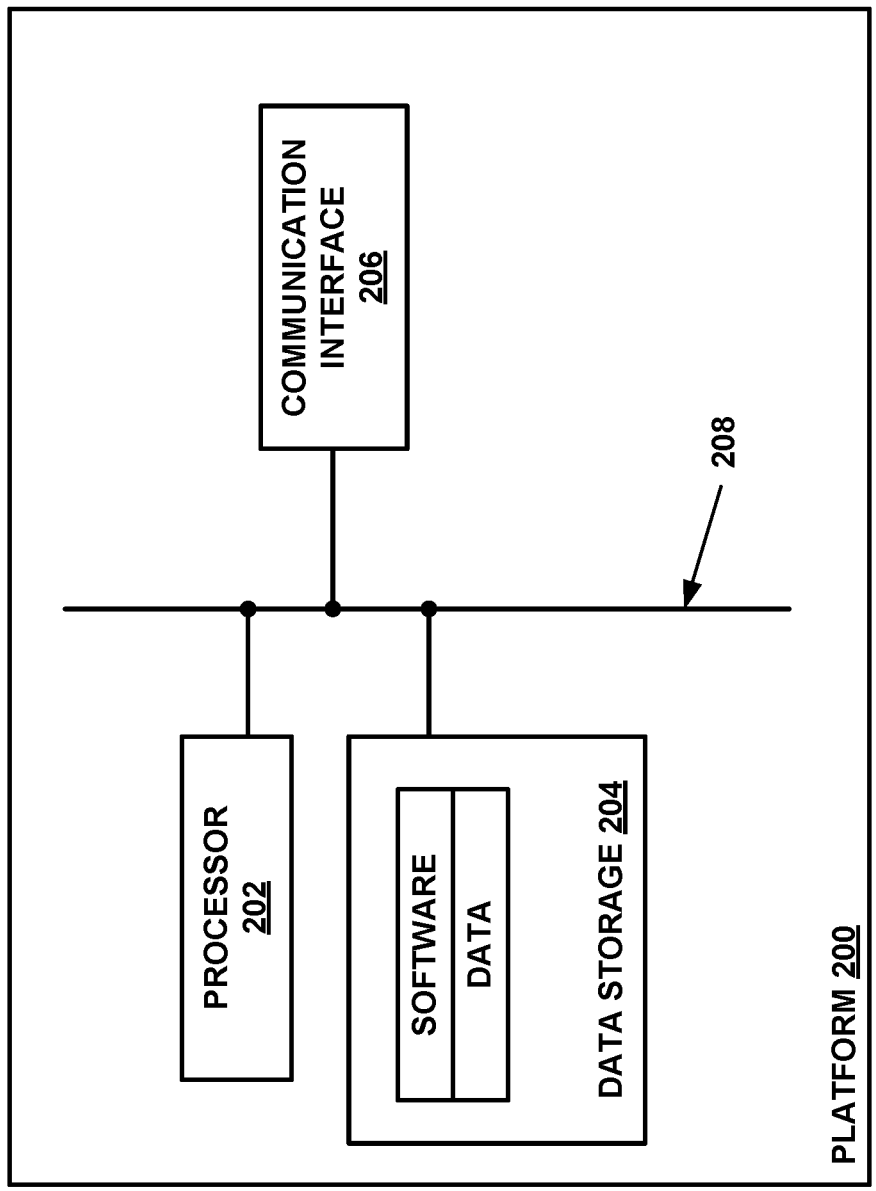
FIG. 2 depicts a simplified block diagram of an example asset data platform from a structural perspective.

FIG. 2 is a simplified block diagram illustrating some structural components that may be included in an example computing platform 200, which could serve as asset data platform 102 in FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 2, data storage 204 may be provisioned with software components that enable the platform 200 to carry out the functions disclosed herein. These software components may generally take the form of program instructions that are executable by the processor 202 to carry out the disclosed functions, which may be arranged together into software applications, virtual machines, software development kits, toolsets, or the like.

Further, data storage 204 may be arranged to store asset-related data in one or more databases, file systems, or the like. For example, data storage 204 may be configured to store data using technologies such as Apache Cassandra, Apache Hadoop, PostgreSQL, and/or MongoDB, among other possibilities. Data storage 204 may take other forms and/or store data in other manners as well.

Communication interface 206 may be configured to facilitate wireless and/or wired communication with data sources and output systems, such as data sources 104 and output systems 106 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

Figure 3:
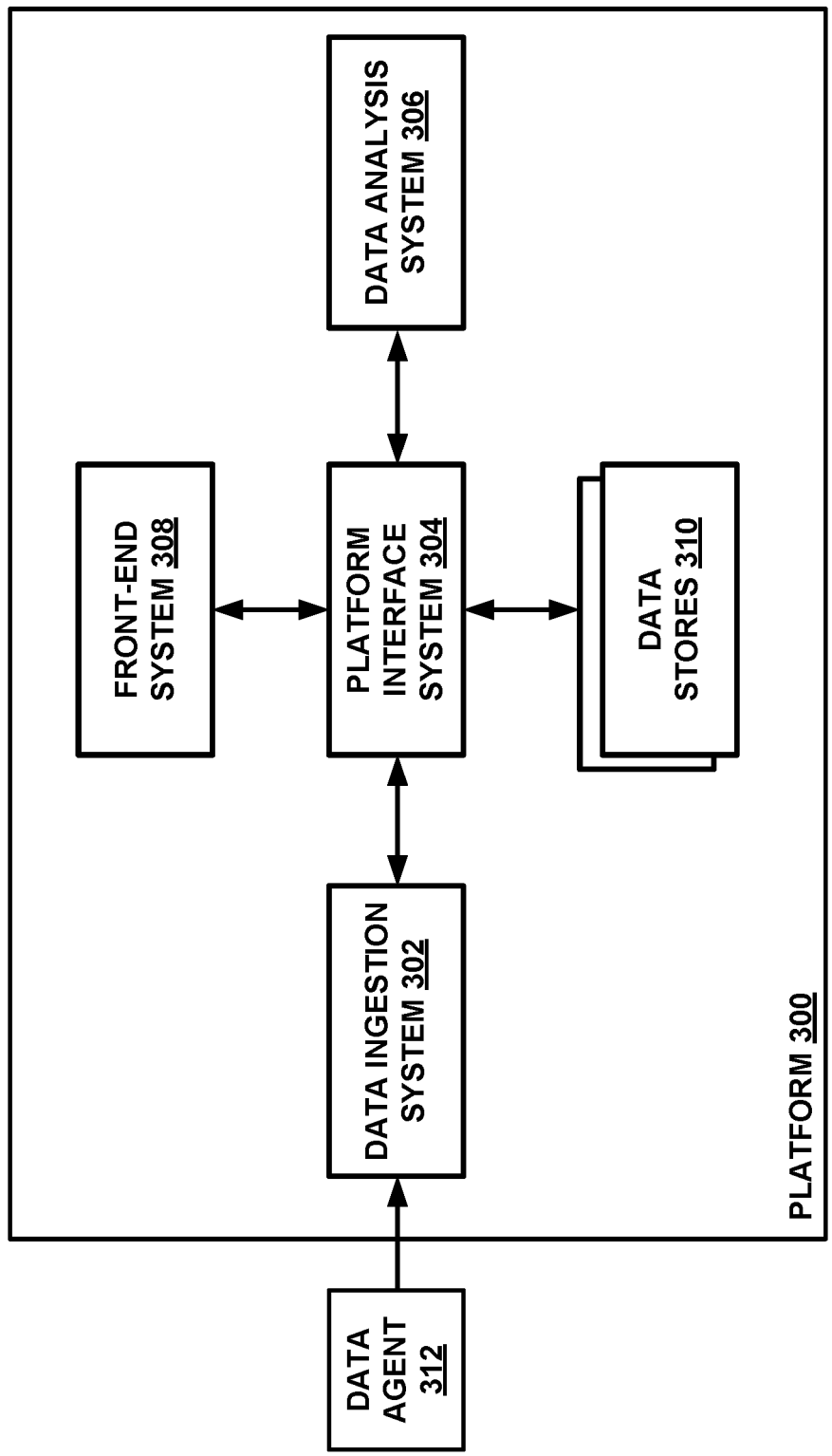
FIG. 3 depicts a simplified block diagram of an example asset data platform from a functional perspective.

Referring now to FIG. 3, another simplified block diagram is provided to illustrate some functional systems that may be included in an example platform 300. For instance, as shown, the example platform 300 may include a data ingestion system 302, a platform interface system 304, a data analysis system 306, a front-end system 308, and one or more data stores 310, each of which comprises a combination of software and hardware that is configured to carry out particular functions. In line with the discussion above, these functional systems may be implemented on one or more computing systems, which may take the form of computing infrastructure of a public, private, and/or hybrid cloud or one or more dedicated servers, among other possibilities.

At a high level, data ingestion system 302 may be configured to ingest asset-related data received from the platform's one or more data sources, transform the ingested data into a standardized structure, and then pass the ingested data to platform interface system 304. In this respect, the function of ingesting received data may be referred to as the "extraction" (or "acquisition") stage within data ingestion system 302, the function of transforming the ingested data into a desired structure may be referred to as the "transformation" stage within data ingestion system 302, and the function of passing the ingested data to platform interface system 304 may be referred to as the "load" stage within data ingestion system 302. (Alternatively, these functions may collectively be referred to as the ETL stage). In some embodiments, data ingestion system 302 may also be configured to enhance the ingested data before passing it to platform interface system 304. This function of enhancing the ingested data may be referred to as the "enhancement" stage within data ingestion system 302. However, data ingestion system 302 may take various other forms and perform various other functions as well.

At the extraction stage, data ingestion system 302 may be configured to receive and ingest various types of asset-related data from various types of data sources, including but not limited to the types of asset-related data and data sources 104 discussed above with reference to FIG. 1. Further, in line with the discussion above, data ingestion system 302 may be configured to receive asset-related data from a data source in various manners. For instance, one possibility, data ingestion system 302 may be configured to receive batch transmissions of asset-related data from a data source. As another possibility, data ingestion system 302 may be configured to receive asset-related data from a data source in a streaming fashion. As yet another possibility, data ingestion system 302 may be configured to receive asset-related data from a data source in response to sending a request for such data to the data source, in which case data ingestion system 302 may be configured to periodically send requests for asset-related data to the data source. As still another possibility, data ingestion system 302 may receive asset-related data from a data source by subscribing to a service provided by the data source (e.g., via an API or the like). Data ingestion system 302 may be configured to receive asset-related data from a data source in other manners as well.

Before data ingestion system 302 receives asset-related data from certain data sources, there may also be some configuration that needs to take place at such data sources. For example, a data source may be configured to output the particular set of asset-related data that is of interest to platform 300. To assist with this process, the data source may be provisioned with a data agent 312, which generally comprises a software component that functions to access asset-related data at the given data source, place the data in the appropriate format, and then facilitate the transmission of that data to platform 300 for receipt by data ingestion system 302. In other cases, however, the data sources may be capable of accessing, formatting, and transmitting asset-related data to platform 300 without the assistance of a data agent.

Turning to the transformation phase, data ingestion system 302 may generally be configured to map and transform ingested data into one or more predefined data structures, referred to as "schemas," in order to standardize the ingested data. As part of this transformation stage, data ingestion system 302 may also drop any data that cannot be mapped to a schema.

In general, a schema is an enforceable set of rules that define the manner in which data is to be structured in a given system, such as a data platform, a data store, etc. For example, a schema may define a data structure comprising an ordered set of data fields that each have a respective field identifier (e.g., a name) and a set of parameters related to the field's value (e.g., a data type, a unit of measure, etc.). In such an example, the ingested data may be thought of as a sequence of data records, where each respective data record includes a respective snapshot of values for the defined set of fields. The purpose of a schema is to define a clear contract between systems to help maintain data quality, which indicates the degree to which data is consistent and semantically correct.

In some implementations, data ingestion system 302 may also be configured to map and transform different types of asset-related data to different schemas. For instance, if the asset-related data received from different data sources is to be input into different types of data analytics operations that have different input formats, it may be advantageous to map and transform such asset-related data received from the different data sources to different schemas.

As part of the transformation stage, data ingestion system 302 may also be configured to perform various other quality checks on the asset-related data before passing it to platform interface system 304. For example, data ingestion system 302 may assess the reliability (or "health") of certain ingested data and take certain actions based on this reliability, such as dropping any unreliable data. As another example, data ingestion system 302 may "de-dup" certain ingested data by comparing it against data that has already been received by platform 300 and then ignoring or dropping duplicative data. As yet another example, data ingestion system 302 may determine that certain ingested data is related to data already stored in the platform's data stores (e.g., a different version of the same data) and then merge the ingested data and stored data together into one data structure or record. Data ingestion system 302 may perform other types of quality checks as well.

It should also be understood that certain data ingested by data ingestion system 302 may not be transformed to a predefined schema (i.e., it is possible that certain ingested data will be "passed through" without performing any transformation on the data), in which case platform 300 may operate on this ingested data as it exists in its original data structure.

As noted above, in some embodiments, data ingestion system 302 may also include an "enhancement" stage where data ingestion system 302 enhances the ingested data before passing it to platform interface system 304. In this respect, data ingestion system 302 may enhance the ingested data in various manners. For instance, data ingestion system 302 may supplement the ingested data with additional asset-related data that is derived by and/or otherwise accessible to platform 300. Such additional data may take various forms. As one example, if the ingested data comprises sensor data, data ingestion system 302 may be configured to supplement the sensor data with "roll-up" data and/or "features" data that is derived from the sensor data. As another possible example, data ingestion system 302 may generate and append certain "enrichments" to the ingested data, examples of which are described in U.S. application Ser. No. 16/004,652, which is incorporated by reference herein in its entirety. Data ingestion system 302 may enhance the ingested data in other manners as well.

After data ingestion system 302 has performed any appropriate transformation and/or enhancement operations on the ingested data, it may pass the ingested data to platform interface system 304, which may be configured to receive data from data ingestion system 302, store the received data in one or more of data stores 310, and make the data available for consumption by the other functional systems of platform 300—including data analysis system 306 and/or front-end system 308. In this respect, the function of passing the ingested data from data ingestion system 302 to platform interface system 304 may take various forms.

According to an example implementation, data ingestion system 302 may begin by categorizing the ingested data into separate data categories (or "domains") that are to be consumed separately by the platform's other functional systems. In turn, data ingestion system 302 may publish the data within each category to a corresponding interface (e.g., an API or the like) that is provided by platform interface system 304. However, it should be understood that other approaches for passing the ingested data from data ingestion system 302 to platform interface system 304 may be used as well, including the possibility that data ingestion system 302 may simply publish the ingested data to a given interface of platform interface system 304 without any prior categorization of the ingested data.

After platform interface system 304 receives the ingested data from data ingestion system 302, platform interface system 304 may cause that data to be stored at the appropriate data stores 310 within platform 300. For instance, in the event that platform interface system 304 is configured to receive different categories of ingested data, platform interface system 304 may be configured store data from a first category into a first data store 310, store data from a second category into a second data store 310, and so on. In addition, platform interface system 304 may store an archival copy of the ingested data into an archival data store 310. Platform interface system 304 may store the ingested data in other manners as well.

After receiving the ingested data from data ingestion system 302, platform interface system 304 may also make the ingested data available for consumption by the platform's other functional systems—including data analysis system 306 and front-end system 308. In this respect, platform interface system 304 may make the ingested data available for consumption in various manners, including through the use of message queues or the like.

After consuming data from platform interface system 304, data analysis system 306 may generally function to perform data analytics operations on such data and then pass the results of those data analytics operations back to platform interface system 304. These data analytics operations performed by data analysis system 306 may take various forms.

As one possibility, data analysis system 306 may create and/or execute predictive models related to asset operation based on asset-related data received from one or more data sources, such as predictive models that are configured to predict occurrences of failures at an asset. One example of a predictive model that may be created and executed by data analysis system 306 is described in U.S. application Ser. No. 14/732,258, which is incorporated by reference herein in its entirety.

As another possibility, data analysis system 306 may create and/or execute models for detecting anomalies in asset-related data received from one or more data sources. Some examples of anomaly detection models that may be created and executed by data analysis system 306 are described in U.S. application Ser. Nos. 15/367,012 and 15/788,622, which are incorporated by reference herein in their entirety.

As yet another possibility, data analysis system 306 may be configured to create and/or execute other types of data analytics programs based on asset-related data received from one or more data sources, examples of which include data analytics programs that evaluate asset-related data using a set of predefined rules (e.g., threshold-based rules), data analytics programs that generate predictive recommendations, data analytics programs that perform noise filtering, and data analytics programs that perform image analysis, among other possibilities.

The data analytics operations performed by data analysis system 306 may take various other forms as well.

Further, it should be understood that some of the data analytics operations discussed above may involve the use of machine learning techniques, examples of which may include regression, random forest, support vector machines (SVM), artificial neural networks, Naïve Bayes, decision trees, dimensionality reduction, k-nearest neighbor (kNN), gradient boosting, clustering, and association, among other possibilities.

As discussed above, after performing its data analytics operations, data analysis system 306 may then pass the results of those operations back to platform interface system 304, which may store the results in the appropriate data store 310 and make such results available for consumption by the platform's other functional systems—including data analysis system 306 and front-end system 308.

In turn, front-end system 308 may generally be configured to drive front-end applications that may be presented to a user via a client station (e.g., client station 106A). Such front-end applications may take various forms. For instance, as discussed above, some possible front-end applications for platform 300 may include an asset performance management application, an asset fleet management application, a service optimization application, and/or an asset dealer operations application, among other possibilities.

In practice, front-end system 308 may generally function to access certain asset-related data from platform interface system 304 that is to be presented to a user as part of a front-end application and then provide such data to the client station along with associated data and/or instructions that define the visual appearance of the front-end application. Additionally, front-end system 308 may function to receive user input that is related to the front-end applications for platform 300, such as user requests and/or user data. Additionally yet, front-end system 308 may support a software development kit (SDK) or the like that allows a user to create customized front-end applications for platform 300. Front-end system 308 may perform other functions as well.

Platform 300 may also include other functional systems that are not shown. For instance, although not shown, platform 300 may include one or more additional functional systems that are configured to output asset-related data and/or instructions for receipt by other output systems, such as third-party data platforms, assets, work-order systems, parts-ordering systems, or the like.

One of ordinary skill in the art will appreciate that the example platform shown in FIGS. 2-3 is but one example of a simplified representation of the structural components and/or functional systems that may be included in a platform, and that numerous others are also possible. For instance, other platforms may include structural components and/or functional systems not pictured and/or more or less of the pictured structural components and/or functional systems. Moreover, a given platform may include multiple, individual platforms that are operated in concert to perform the operations of the given platform. Other examples are also possible.

III. EXAMPLE ASSET

As discussed above with reference to FIG. 1, asset data platform 102 may be configured to perform functions to facilitate the monitoring, analysis, and/or management of various types of assets, examples of which may include transport vehicles (e.g., locomotives, aircrafts, passenger vehicles, trucks, ships, etc.), equipment for construction, mining, farming, or the like (e.g., excavators, bulldozers, dump trucks, earth movers, etc.), manufacturing equipment (e.g., robotics devices, conveyor systems, and/or other assembly-line machines), electric power generation equipment (e.g., wind turbines, gas turbines, coal boilers), petroleum production equipment (e.g., gas compressors, distillation columns, pipelines), and data network nodes (e.g., personal computers, routers, bridges, gateways, switches, etc.), among other examples.

Broadly speaking, an asset may comprise a combination of one or more electrical, mechanical, electromechanical, and/or electronic components that are designed to perform one or more tasks. Depending on the type of asset, such components may take various forms. For instance, a transport vehicle may include an engine, a transmission, a drivetrain, a fuel system, a battery system, an exhaust system, a braking system, a generator, a gear box, a rotor, and/or hydraulic systems, which work together to carry out the tasks of a transport vehicle. However, other types of assets may include other various other types of components.

Figure 4:
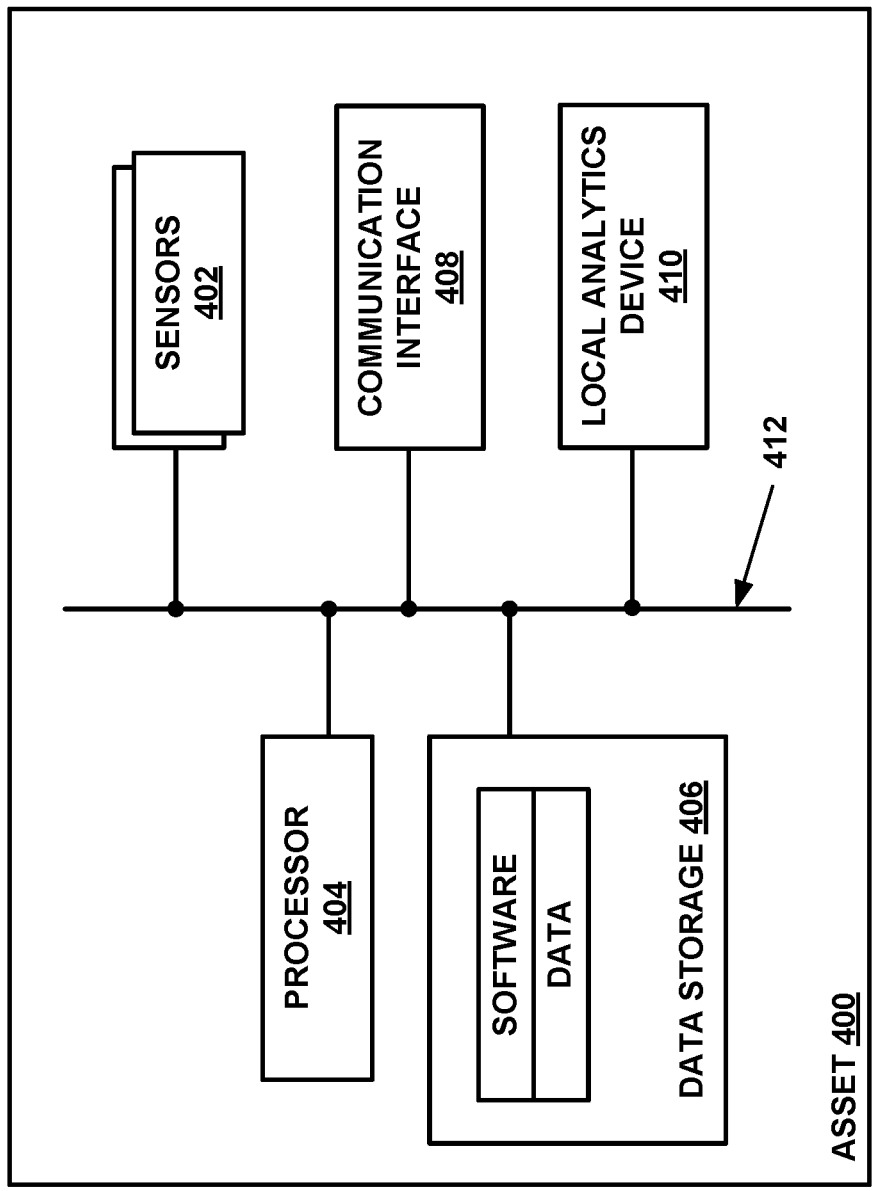
FIG. 4 depicts a simplified block diagram of the on-board components of an example as set.

In addition to the aforementioned components, an asset may also be equipped with a set of on-board components that enable the asset to capture and report operating data. To illustrate, FIG. 4 is simplified block diagram showing some on-board components for capturing and reporting operating data that may be included within or otherwise affixed to an example asset 400. As shown, these on-board components may include sensors 402, a processor 404, data storage 406, a communication interface 408, and perhaps also a local analytics device 410, all of which may be communicatively coupled by a communication link 412 that may take the form of a system bus, a network, or other connection mechanism.

In general, sensors 402 may each be configured to measure the value of a respective operating parameter of asset 400 and then output data that indicates the measured value of the respective operating parameter over time. In this respect, the operating parameters of asset 400 that are measured by sensors 402 may vary depending on the type of asset, but some representative examples may include speed, velocity, acceleration, location, weight, temperature, pressure, friction, vibration, power usage, throttle position, fluid usage, fluid level, voltage, current, magnetic field, electric field, presence or absence of objects, current position of a component, and power generation, among many others.

In practice, sensors 402 may each be configured to measure the value of a respective operating parameter continuously, periodically (e.g., based on a sampling frequency), and/or in response to some triggering event. In this respect, each sensor 402 may have a respective set of operating parameters that defines how the sensor performs its measurements, which may differ on a sensor-by-sensor basis (e.g., some sensors may sample based on a first frequency, while other sensors sample based on a second, different frequency). Similarly, sensors 402 may each be configured to output data that indicates the measured value of its respective operating parameter continuously, periodically (e.g., based on a sampling frequency), and/or in response to some triggering event.

Based on the foregoing, it will be appreciated that sensors 402 may take various different forms depending on the type of asset, the type of operating parameter being measured, etc. For instance, in some cases, a sensor 402 may take the form of a general-purpose sensing device that has been programmed to measure a particular type of operating parameter. In other cases, a sensor 402 may take the form of a special-purpose sensing device that has been specifically designed to measure a particular type of operating parameter (e.g., a temperature sensor, a GPS receiver, etc.). In still other cases, a sensor 402 may take the form of a special-purpose device that is not primarily designed to operate as a sensor but nevertheless has the capability to measure the value of an operating parameter as well (e.g., an actuator). Sensors 402 may take other forms as well.

Processor 404 may comprise one or more processor components, such as general-purpose processors, special-purpose processors, programmable logic devices, controllers, and/or any other processor components now known or later developed. In turn, data storage 406 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 4, data storage 406 may be arranged to contain executable program instructions (i.e., software) that cause asset 400 to perform various functions related to capturing and reporting operating data, along with associated data that enables asset 400 to perform these operations. For example, data storage 406 may contain executable program instructions that cause asset 400 to obtain sensor data from sensors 402 and then transmit that sensor data to another computing system (e.g., asset data platform 102). As another example, data storage 406 may contain executable program instructions that cause asset 400 to evaluate whether the sensor data output by sensors 402 is indicative of any abnormal conditions at asset 400 (e.g., by applying logic such as threshold-based rules to the measured values output by sensors 402), and then if so, to generate abnormal-condition data that indicates occurrences of abnormal conditions. The executable program instructions and associated data stored in data storage 406 may take various other forms as well.

Communication interface 408 may be configured to facilitate wireless and/or wired communication between asset 400 and various computing systems, including an asset data platform such as asset data platform 102. As such, communication interface 408 may take any suitable form for carrying out these functions, examples of which may include a chipset and antenna adapted to facilitate wireless communication, an Ethernet interface, a serial bus interface (e.g., Firewire, USB 2.0, etc.), and/or any other interface that provides for wireless and/or wired communication. Communication interface 408 may also include multiple communication interfaces of different types. Other configurations are possible as well. It should also be understood that asset 400 may not be equipped with its own on-board communication interface.

In some circumstances, it may also be desirable to perform certain data analytics operations locally at asset 400, rather than relying on a central platform to perform data analytics operations. Indeed, performing data analytics operations locally at asset 400 may reduce the need to transmit operating data to a centralized platform, which may reduce the cost and/or delay associated with performing data analytics operations at the central platform and potentially also increase the accuracy of certain data analytics operations, among other advantages.

In this respect, in some cases, the aforementioned on-board components of asset 400 (e.g., processor 404 and data storage 406) may provide sufficient computing power to locally perform data analytics operations at asset 400, in which case data storage 406 may be provisioned with executable program instructions and associated program data for performing the data analytics operations. However, in other cases, the aforementioned on-board components of asset 400 (e.g., processor 404 and/or data storage 406) may not provide sufficient computing power to locally perform certain data analytics operations at asset 400. In such cases, asset 400 may also optionally be equipped with local analytics device 410, which may comprise a computing device that is capable of performing data analytics operations and other complex operations that go beyond the capabilities of the asset's other on-board components. In this way, local analytics device 410 may generally serve to expand the on-board capabilities of asset 400.

Figure 5:
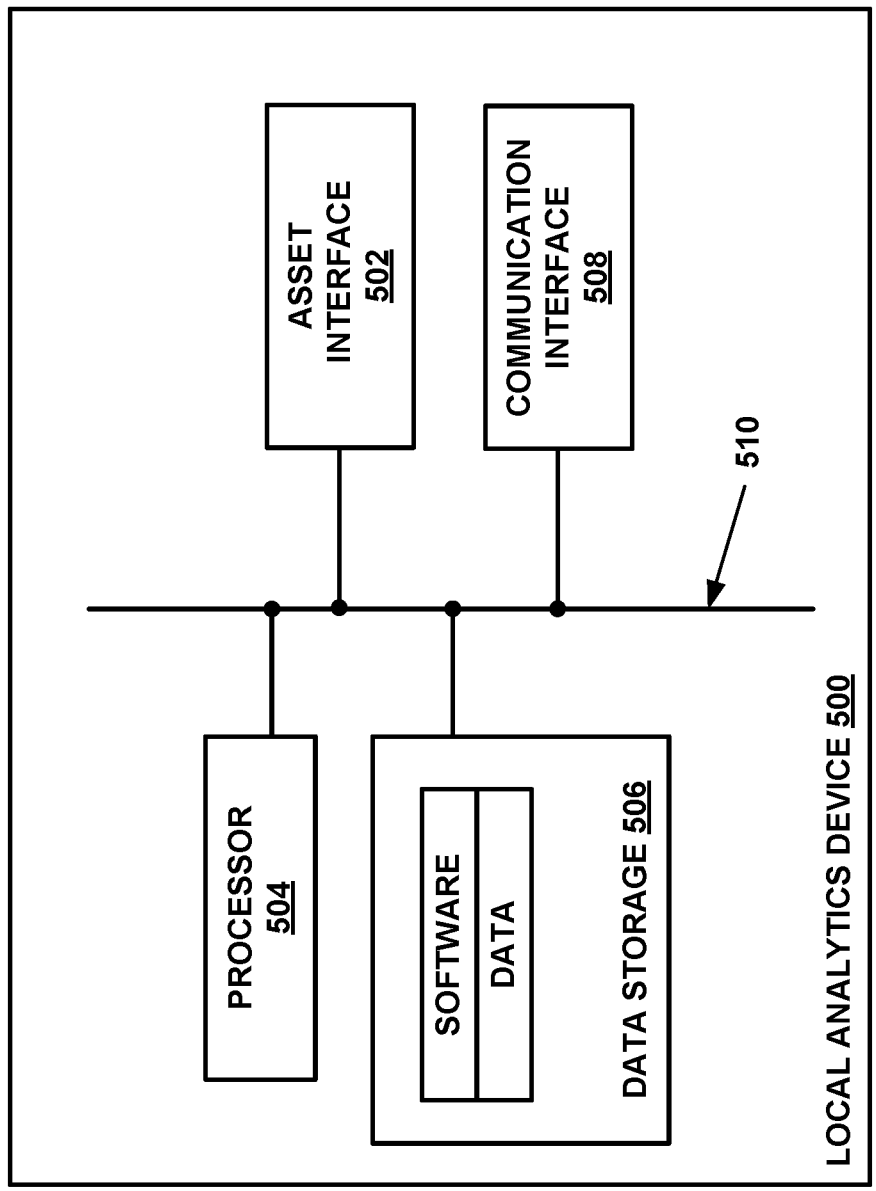
FIG. 5 depicts a simplified block diagram of an example local analytics device.

FIG. 5 illustrates a simplified block diagram showing some components that may be included in an example local analytics device 500. As shown, local analytics device 500 may include an asset interface 502, a processor 504, data storage 506, and a communication interface 508, all of which may be communicatively coupled by a communication link 510 that may take the form of a system bus, a network, or other connection mechanism.

Asset interface 502 may be configured to couple local analytics device 500 to the other on-board components of asset 400. For instance, asset interface 502 may couple local analytics device 500 to processor 404, which may enable local analytics device 500 to receive data from processor 404 (e.g., sensor data output by sensors 402) and to provide instructions to processor 404 (e.g., to control the operation of asset 400). In this way, local analytics device 500 may indirectly interface with and receive data from other on-board components of asset 400 via processor 404. Additionally or alternatively, asset interface 502 may directly couple local analytics device 500 to one or more sensors 402 of asset 400. Local analytics device 500 may interface with the other on-board components of asset 400 in other manners as well.

Processor 504 may comprise one or more processor components that enable local analytics device 500 to execute data analytics programs and/or other complex operations, which may take the form of general-purpose processors, special-purpose processors, programmable logic devices, controllers, and/or any other processor components now known or later developed. In turn, data storage 506 may comprise one or more non-transitory computer-readable storage mediums that enable local analytics device 500 to execute data analytics programs and/or other complex operations, examples of which may include volatile storage mediums such as random-access memory, registers, cache, etc. and non-volatile storage mediums such as read-only memory, a hard-disk drive, a solid-state drive, flash memory, an optical-storage device, etc.

As shown in FIG. 5, data storage 506 may be arranged to contain executable program instructions (i.e., software) that cause local analytics device 500 to perform data analytics operations and/or other complex operations that go beyond the capabilities of the asset's other on-board components, as well as associated data that enables local analytics device 500 to perform these operations.

Communication interface 508 may be configured to facilitate wireless and/or wired communication between local analytics device 500 and various computing systems, including an asset data platform such as asset data platform 102. In this respect, local analytics device 500 may communicate the results of its operations to an asset data platform via communication interface 508, rather than via an on-board communication interface of asset 400. Further, in circumstances where asset 400 is not be equipped with its own on-board communication interface, asset 400 may use communication interface 508 to transmit operating data to an asset data platform. As such, communication interface 508 may take any suitable form for carrying out these functions, examples of which may include a chipset and antenna adapted to facilitate wireless communication, an Ethernet interface, a serial bus interface (e.g., Firewire, USB 2.0, etc.), and/or any other interface that provides for wireless and/or wired communication. Communication interface 508 may also include multiple communication interfaces of different types. Other configurations are possible as well.

In addition to the foregoing, local analytics device 500 may also include other components that can be used to expand the on-board capabilities of an asset. For example, local analytics device 500 may optionally include one or more sensors that are configured to measure certain parameters, which may be used to supplement the sensor data captured by the asset's on-board sensors. Local analytics device 500 may include other types of components as well.

Returning to FIG. 4, although not shown, asset 400 may also be equipped with hardware and/or software components that enable asset 400 to adjust its operation based on asset-related data and/or instructions that are received at asset 400 (e.g., from asset data platform 102 and/or local analytics device 410). For instance, as one possibility, asset 400 may be equipped with one or more of an actuator, motor, value, solenoid, or the like, which may be configured to alter the physical operation of asset 400 in some manner based on commands received from processor 404. In this respect, data storage 406 may additionally be provisioned with executable program instructions that cause processor 404 to generate such commands based on asset-related data and/or instructions received via communication interface 408. Asset 400 may be capable of adjusting its operation in other manners as well.

Further, although not shown, asset 400 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with the on-board components of asset 400.

One of ordinary skill in the art will appreciate that FIGS. 4-5 merely show one example of the components of an asset, and that numerous other examples are also possible. For instance, the components of an asset may include additional components not pictured, may have more or fewer of the pictured components, and/or the aforementioned components may be arranged and/or integrated in a different manner. Further, one of ordinary skill in the art will appreciate that two or more of the components of asset 400 may be integrated together in whole or in part. Further yet, one of ordinary skill in the art will appreciate that at least some of these components of asset 400 may be affixed or otherwise added to asset 400 after it has been placed into operation.

IV. EXAMPLE OPERATIONS

As described above, disclosed herein is new technology for creating an event prediction model, which uses a data-driven approach to intelligently the select model's set of input data variables. As described above, an event prediction model generally refers to a predictive model that is configured to output a prediction of whether an event occurrence of a given type is forthcoming (e.g., whether an event is likely to occur within some period of time in the foreseeable future). Such an event prediction model may take various forms.

For instance, the given type of event occurrence that is predicted by an event prediction model may take any of various forms. As one example, the given type of event occurrence may be an occurrence of a failure on an asset, such as a failure of a particular type of asset component or a failure of a particular asset system or subsystem. As another example, the given type of event occurrence may be an occurrence of a particular type of change in an asset's operation, such as an asset shutdown. As yet another example, the given type of event occurrence may be an occurrence of a particular type of an external event that may impact an asset's operation, such as a particular weather event or a particular change in an environment where an asset is operating (referred to herein as an "operating environment"). The given type of event occurrence that is predicted by an event prediction model may take various other forms as well—including the possibility that the given type of event occurrence is related to something other than the operation of an asset.

Further, the input data for an event prediction model may generally include any type of data that may be suggestive of whether or not an event occurrence of the given type is forthcoming. In this respect, depending on the given type of event occurrence that is predicted by an event occurrence model, the input data may take any of various forms. For instance, when the given type of event occurrence being predicted by an event prediction model is an event related to the operation of a given asset under evaluation (e.g., an asset failure), the input data may include operating data for the given asset and/or other related assets (e.g., sensor data, abnormal-conditions data, and/or data derived therefrom), asset maintenance data for the given asset and/or other related assets, and/or environmental data for the given asset and/or other related assets, among other possibilities. The input data for an event prediction model may take various other forms as well—including the possibility that the input data is related to something other than the operation of an asset.

Further yet, an event prediction model's output may take any of various forms. In one implementation, an event prediction model may be configured such that each time it evaluates input data to render a prediction of whether an event occurrence of the given type is forthcoming, the event prediction model may output a metric reflecting a likelihood that an event occurrence is forthcoming, which may then be compared to an "event-occurrence threshold" to make a binary determination of whether the event occurrence is forthcoming. In such an implementation, the metric reflecting a likelihood that an event occurrence is forthcoming may take various forms. As one possible example, the metric reflecting a likelihood that an event occurrence is forthcoming may take the form of a probability metric reflecting a predicted probability of an event occurrence happening within some period of time in the future (e.g., within the next 2 weeks) that may be represented on a scale of either 0 to 100 or 0.0 to 1.0, and the event-occurrence threshold may then be represented on the same scale. However, the metric reflecting a likelihood that an event occurrence is forthcoming may take various other forms as well.

In another implementation, an event prediction model may be configured such that each time it evaluates input data to render a prediction of whether an event occurrence of the given type is forthcoming, the event prediction model outputs a binary indication of whether or not it predicts an event occurrence to be forthcoming, such as an indicator that has a first value if the model predicts that an event occurrence is not likely to happen within some period of time in the future (e.g., a value of "0" or "No") and a second value if the model predicts that an event occurrence is likely to happen within some period of time in the future (e.g., a value of "1" or "Yes").

In yet another implementation, an event prediction model may be configured such that it only outputs an indicator when it predicts an event occurrence to be forthcoming, and otherwise does not output any data (i.e., it may output a null). In such an implementation, the indicator that is output by the event prediction model when it predicts an event occurrence to be forthcoming may take any of various forms, including but not limited to a simple indicator reflecting that a positive prediction has been rendered by the event prediction model (e.g., a "1" or "Yes") or a more detailed indicator identifying the given type of event occurrence that is predicted by the event prediction model (e.g., an event code).

In still another implementation, an event prediction model may be configured such that it outputs a categorization of a predicted event occurrence. For instance, an event prediction model may be configured to output a severity level of a predicted event occurrence that indicates how severely an asset's operation is expected to be impacted by the predicted event occurrence, which could take the form of a "high" (or "critical") severity level used to indicate an event occurrence that is expected to have a significant impact on an asset's operation (e.g., a failure occurrence that is expected to render an asset inoperable), a "medium" severity level used to indicate an event occurrence that is expected to have a moderate impact on an asset's operation (e.g., a failure occurrence that is expected to limit an asset's operation but not render it inoperable), or a "low" severity level used to indicate an event occurrence that are expected to have minimal impact on an asset's operation, among other possibilities. It is also possible that an event prediction model may be configured to output other types of categorizations, such as a categorization based on safety, compliance, or the like. Further, to the extent that event prediction model is configured to output a categorization of a predicted event occurrence, that categorization may take various forms, examples of which include a textual indicator (e.g., "High," "Medium," "Low," etc.) or a numerical indicator that represents the categorization level, among other possibilities.

In a further implementation, an event prediction model may be configured such that it outputs a "recommended operating mode" for an asset, which is a recommendation of the particular manner in which the asset should be used that is determined based on both (1) whether an event occurrence of the given type is predicted for the asset in the foreseeable future and (2) a categorization of the predicted event occurrence that (e.g., a failure severity level or other type of categorization based on safety, compliance, or the like). In this respect, a recommend operating mode output by an event prediction model may take various forms, examples of which may include an "Inoperable" (or "Do Not Operate") mode, a "Limited Use" mode (e.g., a "Trail Only" or "Non-Lead" mode for a locomotive), or a "Full Operation" mode. However, a recommended operating mode may take various other forms as well, including the possibility that the recommended operating modes may be customized for particular asset types, particular industries, and/or particular end users, as examples. It should also be understood that a recommended operating mode could potentially include a more detailed recommendation of how to operate an asset than the examples set forth above (e.g., a recommended operating mode may comprise a set of multiple recommendations as to how to operate multiple different subsystems or components of the asset). Likewise, it should be understood that a recommended operating mode may take different forms depending on the particular approach used for categorizing the failure types (e.g., a severity-based categorization vs. a safety-based or compliance-based categorization).

An event prediction model's output may take other forms as well.

Still further, an event prediction model may be defined in any of various manners. In one implementation, the process of defining an event prediction model may generally involve (a) obtaining a set of training data for the event prediction model, which may comprise historical values for a set of input data variables that are potentially suggestive of whether or not an event occurrence the given type is forthcoming, (b) analyzing the set of training data using a supervised and/or unsupervised machine learning technique in order to derive a relationship between (i) the values of at least a subset of the set of data variables and (ii) a likelihood that an event occurrence of the given type is forthcoming, and (c) embodying the derived relationship into a predictive model. In this respect, the supervised and/or unsupervised machine learning technique used to define the event prediction model may take any of various forms, examples of which may include regression, random forest, SVM, artificial neural networks, Naïve Bayes, decision trees, dimensionality reduction, kNN, gradient boosting, clustering, and association, among other possibilities. The process of defining an event prediction model may take other forms as well.

An event prediction model may take various other forms as well. For instance, in one implementation, an event prediction model may take the form of a "combined" event prediction model that comprises a collection of multiple individual event prediction models and is configured to output a prediction of whether any one or more different types of event occurrences are forthcoming. One specific example of such a combined event prediction model may comprise a collection of individual failure models that are each configured to output an indication of whether a respective failure type of a group of failure types is predicted to occur at an asset in the foreseeable future, and the output of such a model may take the form of a metric reflecting a likelihood of at least one failure type in the group of failure types occurring at the asset in the foreseeable future (or the complement thereof), a binary indicator of whether or not at least one failure type in the group of failure types is predicted to occur at the asset in the foreseeable future, a categorization associated with at least one failure type in the group of failure types that is predicted to occur at the asset in the foreseeable future (e.g., the severity level of the most-severe failure type predicted to occur), and/or a recommended operating mode of the asset. Such an example of a combined event prediction model is described in further detail in U.S. application Ser. Nos. 14/732,258 and 16/125,335, which are incorporated by reference herein in their entirety. Many other types of event prediction models exist as well.

Regardless of its exact form, a primary purpose of an event prediction model is to enable a data analytics platform to preemptively notify a user that an event occurrence of a given type is forthcoming sufficiently in advance of when the event occurrence actually happens, so that action can be taken to address the event occurrence before it actually happens. For instance, in the context of an event prediction model that is configured to predict whether an occurrence of an asset failure is forthcoming, the primary purpose is to enable a data analytics platform (such as asset data platform 102) to preemptively notify a user that the occurrence of the asset failure is forthcoming sufficiently in advance of when the asset failure actually occurs, so that the asset can be taken out of circulation and/or maintenance can be performed before the failure actually occurs. In this way, an event prediction model may help to mitigate the costs that may otherwise result from an unexpected occurrence of an undesirable event like an asset failure—such as an increase in maintenance cost and/or a decrease in productivity—and may thus provide a positive net value to a user.

To achieve this purpose, an event prediction model for a given type of event may be designed to output its prediction of a forthcoming event occurrence during a particular window of time preceding the event occurrence referred as an "event window," which is a window of time during which a preemptive prediction of an event occurrence of the given type is considered to provide sufficient net value. In this respect, the beginning of an event window for an event occurrence of the given type may be set to the earliest time (relative to the actual time of the forthcoming event occurrence) at which a preemptive notification of the event occurrence is still expected to provide sufficient net value, while the end of the event window for an event occurrence of the given type may be set to the latest time (relative to the actual time of the forthcoming event occurrence) at which a preemptive notification of the event occurrence is still expected to provide sufficient net value.

Such an event window may take various forms, which may depend on factors such as the type of event occurrence being predicted, the cost associated with addressing an event occurrence of the given type, how the model's prediction accuracy is expected to change as predictions are rendered earlier in time, and the lead time needed to address an event occurrence of the given type, among other possibilities. As one representative example, an event window for an event occurrence of a given type may be set to (a) begin approximately 1-2 weeks before the actual time of the event occurrence and (b) end approximately 1-2 days before the actual time of the event occurrence. However, it should be understood that this representative example is merely provided for purposes of illustration, and that an event window for an event occurrence of the given type may begin and end at various other times relative to the event occurrence as well. Further, in some embodiments, it is possible that the beginning and end points of the event window may vary for different event occurrences of the same given type (e.g., based on external factors such as when the last event occurrence of the given type happened).

Based on the foregoing, it will be appreciated that the ability of an event prediction model to output accurate, timely predictions of forthcoming event occurrences of a given type depends in large part on the particular set of input data variables that the event prediction model uses to render those predictions. Indeed, in order for a given event prediction model to output an accurate, timely prediction of whether an event occurrence is forthcoming, the model's set of input data variables generally should be of a nature that the data values thereof, either alone or in some combination with one another, exhibit some indication that an event occurrence event of the given type is forthcoming that can be deduced by the event prediction model (e.g., by changing in a particular way) sufficiently in advance of the forthcoming event occurrence.

As such, one important aspect of creating an event prediction model for a given type of event is selecting the particular set of input data variables that the event prediction model uses to render its predictions. In this respect, the primary goal is to select data variables having values that provide an indication of an event occurrence of the given type sufficiently in advance of that event occurrence, such that the event prediction model can detect the indication and then begin outputting its prediction that the event occurrence is forthcoming. For example, data variables having values that meaningfully change in the window of time leading up to an event occurrence of the given type may be good candidates to include in the set of input data variables used by the event prediction model to render its predictions. On the other hand, data variables having values that do not appear to meaningfully change in the window of time leading up to an event occurrence of the given type may not be good candidates to include in the set of input data variables used by the event prediction model to render its predictions.

However, existing technology for creating an event prediction model tends to select the model's set of input data variables based heavily (if not exclusively) on input from a subject matter expert (SME) or the like, which has several limitations. For example, while an SME typically has knowledge regarding some possible causes of an event occurrence of a given type (e.g., an occurrence of a given failure mode), the SME is often incapable of identifying the entire universe of causes for an event occurrence of the given type, and also may be unable to identify the actual root cause of an event occurrence of the given type at a granular level. As another example, while an SME may be able to identify that a particular behavior of a data variable is correlated to an event occurrence of a given type, the SME may be unable to identify the specific point in time at which the data variable's values are most likely to be indicative of an event occurrence of the given type. As yet another example, an SME is typically only focused a limited set of data variables that may be associated with event occurrences of the given type, rather than the much larger universe of data variables that are available to an asset data platform (including but not limited to data variables that are derived by the asset data platform based on raw data). As yet another example, an SME may have knowledge of how the asset works theoretically, but oftentimes the environment in which an asset operates changes its behavior, creating new failure modes that may be outside of the scope of an SME's knowledge. In this respect, the new behaviors may be such that an SME's knowledge may never be able to sufficiently account for that behavior. As a result of these limitations, the set of input data variables selected for an event prediction model often does not include the data variables that provide the best indication of a forthcoming event occurrence of the given type, which degrades the event prediction model's ability to provide accurate, timely predictions. Thus, there is a need for technology that helps create a more accurate event prediction model.

Figure 6:
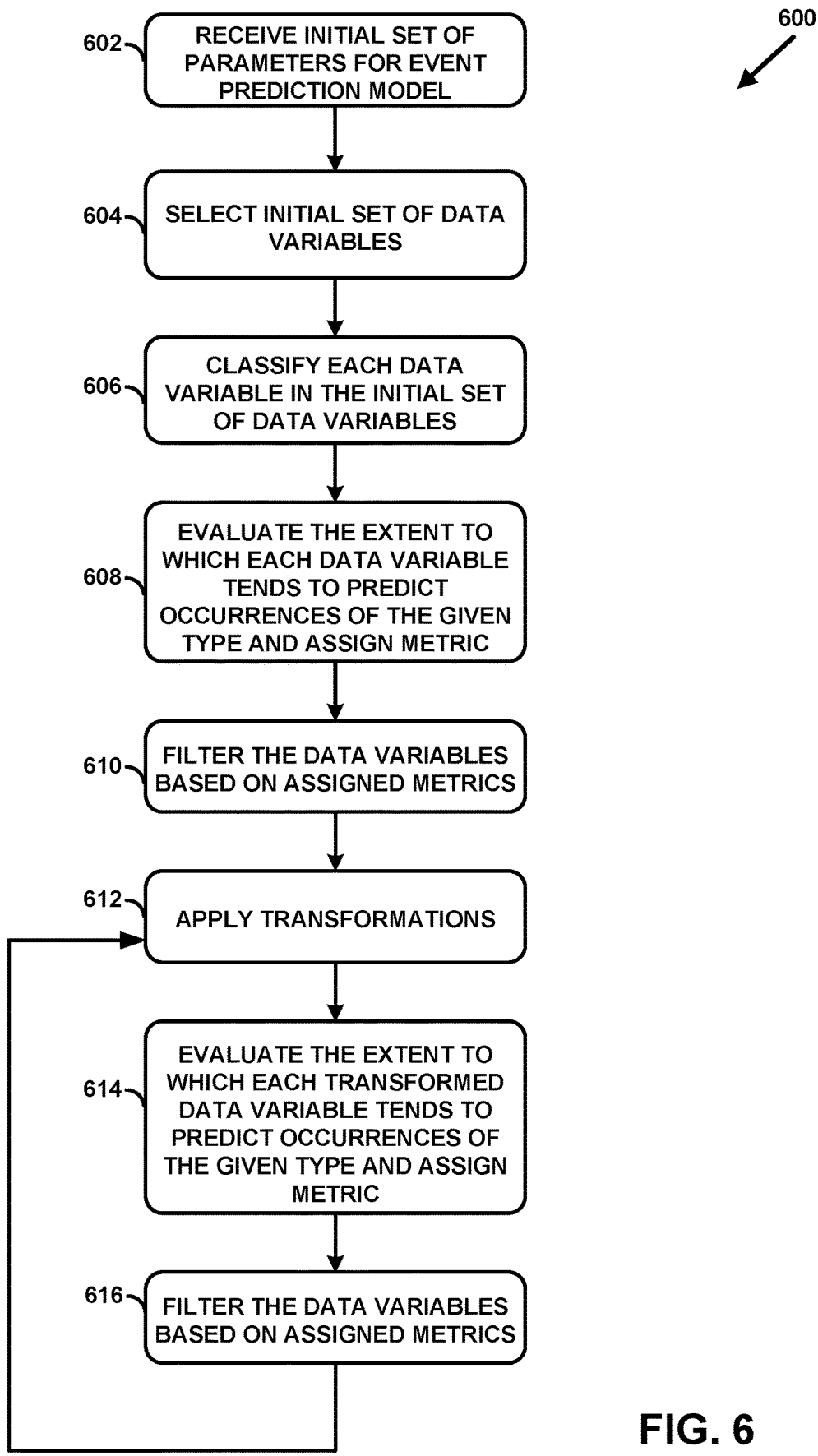
FIG. 6. is a flow diagram showing some example operations that may be included in a process for creating an event prediction models configured to preemptively predict event occurrences of a given type, according to an example embodiment.

To address these and other problems with existing technology, disclosed herein is a new process for creating an event prediction model that employs a data-driven approach for selecting the model's set of input data variables. To help describe this new process, FIG. 6 depicts a functional block diagram 600 that illustrates one example embodiment of the disclosed process. For the purposes of illustration, the example operations embodied by the blocks in block diagram 600 and described further herein below are described as being carried out by asset data platform 102, but it should be understood that data analytics platforms other than asset data platform 102 may perform the example operations. Likewise, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As shown in FIG. 6, the disclosed process may begin at block 602 with asset data platform 102 receiving an initial set of parameters for the event prediction model to be created by asset data platform 102. This initial set of parameters may include an identification of the type of event to be predicted by the event prediction model (e.g., a given failure mode for a particular class of assets) and perhaps also an indication of the event window to be used by the event prediction model for the given type of event to be predicted, among other possibilities. Further, asset data platform 102 may receive this initial set of parameters in various manners. As one example, asset data platform 102 may receive the initial set of parameters from a user of the platform, who may input the initial set of parameters via a client station coupled to asset data platform 102, such as client station 104E, or a user interface of asset data platform 102, among other possibilities.

At block 604, asset data platform 102 may select an initial set of data variables to use for the event prediction model. Generally, the initial set of data variables may comprise any data variable from among the universe of data variables available to asset data platform 102, such as those received at asset data platform 102 from data sources 104, among other possibilities. For instance, the data variables included within the initial set of data variables may include (i) one or more operating data variables received from asset 104A, such as one or more sensor data variables collected by a sensor of an asset, or one or more abnormal-conditions data variables, among other possible data variables collected by an asset; (ii) one or more operating data variables received from operating data source 104B; (iii) one or more maintenance data variables received from asset maintenance data source 104C; (iv) one or more environmental data variables received from environmental data source 104D; (v) one or more user input data variables received from client station 104E; and/or (vi) one or more derived data variables that are derived based on the forgoing data variables, such as roll-up data variables and/or features data variables.

Asset data platform 102 may select the initial set of data variables in various manners. As one possibility, asset data platform 102 may select the initial set of data variables based on input from a user of the platform, who may input a selection of the initial set of data variables via a client station coupled to the asset data platform, such as client station 104E, or a user interface of the asset data platform, among other possibilities. For instance, asset data platform 102 may cause a client station to present a user with a list of data variables available to the asset data platform that may possibly serve as input data variables for the event prediction model being created (e.g., data variables that have some possible association with the given type of event being predicted). From this list, the user may then select the initial set of data variables, which may cause the client station to transmit this selection to the asset data platform. As will be appreciated, however, in a typical scenario, such a list may comprise thousands, if not tens of thousands, of possible data types, which may be too unwieldy for a user to choose from. Accordingly, in another example, asset data platform 102 may select some subset of data variables from among the universe of possible data variables available to the asset data platform and present this subset of data variables to the user via a client station coupled to asset data platform 102 or a user interface of the asset data platform. In this way, a user may then select an initial set of data variables from among this subset of data variables, which may cause the client station to transmit this selection to the asset data platform. In one example of this user selection, a user, such as an SME, may select the initial set of data variables based on a hypothesis of which data variables are predictive of the given type of event occurrence.

As another possibility, asset data platform 102 may select the initial set of data variables based on something other than user input. For example, the data analytics platform may refer to an existing event prediction model that shares similarities with the event prediction model being created (e.g., an existing event prediction model for a comparable type of event that occurs in another industry) and then select the initial set of data variables to be the same as or similar to the input data variables used by that existing event prediction model. As another example, asset data platform 102 may maintain or have access to a data table that correlates event types with data variables known to be associated with those event types, in which case asset data platform 102 may select the initial set of data variables based on such a data table. The data analytics platform may select the initial set of data variables in other manners as well, including the possibility that the data analytics platform may select the initial set of data variables using a combination of the techniques described above.

Returning to FIG. 6, at block 606, asset data platform 102 may next optionally classify each respective data variable in the initial set of data variables. Classifying the data variables in the initial set of data variables may help drive some of the later steps in the process. In particular, as will be described further herein, some steps of the disclosed process may involve using the classification of a given data variable as a basis to take one or more actions with respect to the given data variable.

In one implementation, asset data platform 102 may classify each respective data variable in the initial set of data variables based on some predetermined data indicative of a respective classification for the respective data variable. This predetermined data may take the form of, for instance, two or more possible classifications, in which case asset data platform 102 may determine, for each respective data variable in the set of initial data variables, which of these two or more possible classifications to use for the respective data variable. In another embodiment, this predetermined data may take the form of a hierarchy of possible classifications with multiple levels of classification granularity. In such an embodiment, asset data platform 102 may determine, for each respective data variable in the set of initial data variables, which classification or classifications from the hierarchy to use for the respective data variable.

In one specific example, the data analytics platform may classify the data variables according to whether a respective data variable is a "continuous" data variable or a "categorical" data variable. A continuous data variable is a data variable that can have a data value that exists in a continuous range of values. Engine temperature is one example of a data variable that may be classified as continuous because the value of the engine temperature variable can exist as any value in a range of between a low bound of, say, 0° C. and a high bound of, say, 600° C. Battery voltage is another example of a data variable that may be classified as continuous because the value of the battery voltage variable can exist as any value in a range of values between a low bound of, say, 0V and a high bound of, say, 18V. On the other hand, a categorical data variable is a data variable that typically takes on one of a few possible discrete values or states. A data variable indicating the presence or absence of a specific fault condition at an asset is one example of a categorical data variable because the data variable takes on either one of two discrete states: an "affirmative" or "1" indicating, for instance, the presence of a fault condition, or a "negative" or "0" indicating, for instance, the absence of a fault condition.

In an example in which asset data platform 102 may further classify each data variable on a more granular level, asset data platform 102 may refer to a known hierarchy of data variable classifications to determine one or more possible sub-classifications for each respective data variable. For instance, asset data platform 102 may refer to a known hierarchy of data variable classifications in order to further classify the continuous data variables into one or more possible sub-classifications and to further classify the categorical data variables into one or more sub-classifications.

Figure 7:
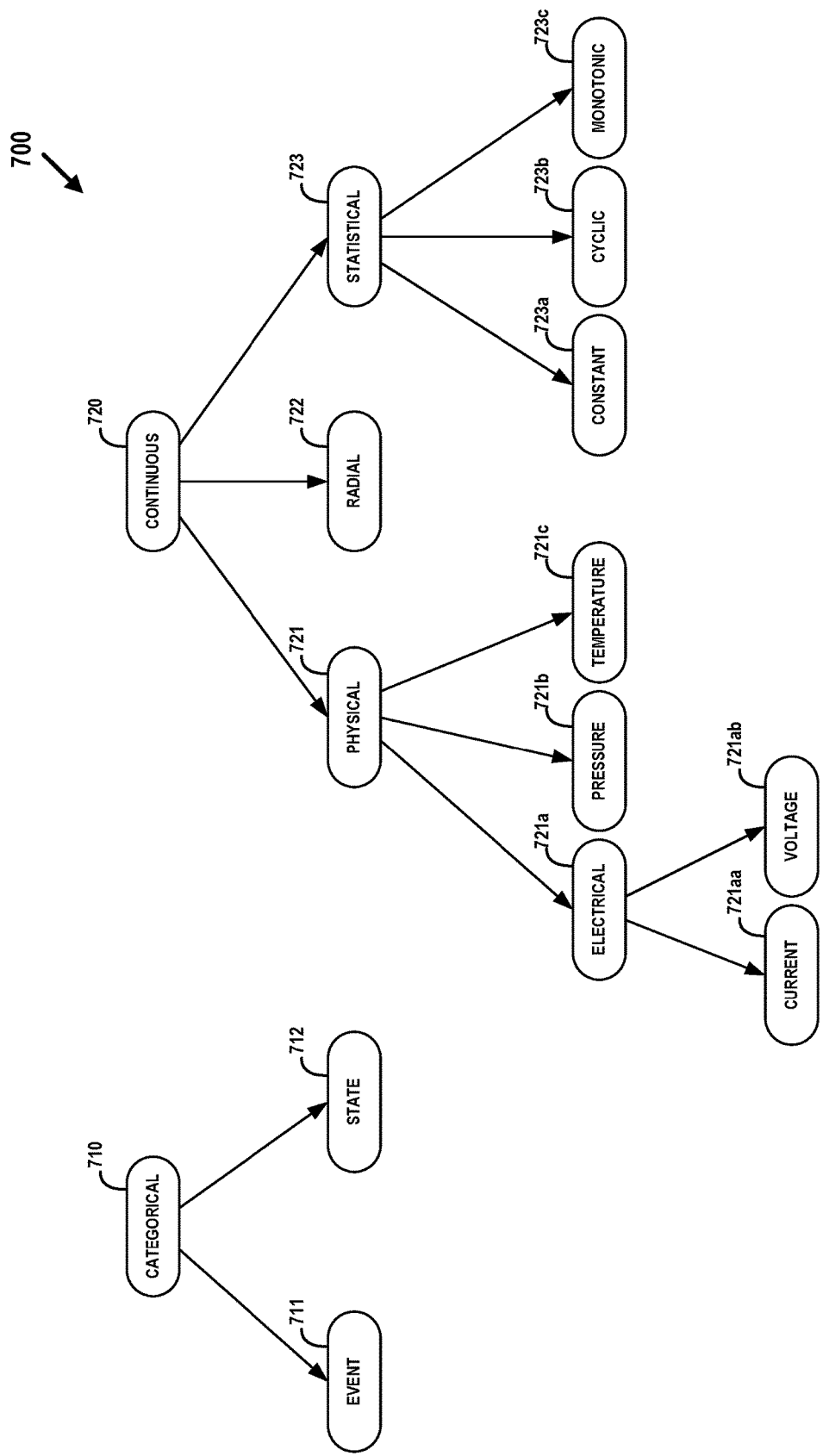
FIG. 7 depicts an example data variable hierarchy that may be used to classify a set of one or more data variable, according to an example embodiment.

To illustrate this, FIG. 7 depicts one example of a data variable hierarchy 700 from which asset data platform 102 could use to classify each data variable in the initial set of data variables. As depicted, the data variable hierarchy 700 includes a hierarchy of several possible classifications. For instance, data variable hierarchy 700 includes two top-level classifications, "categorical" classification 710 and "continuous" classification 720. Data variable hierarchy 700 further includes two sub-classifications under the categorical classification 710, including an "event" sub-classification 711 and a "state" sub-classification 712. The continuous classification 720 includes three sub-classifications, including a "physical" sub-classification 721, a "radial" sub-classification 722, and a "statistical" sub-classification 723. The physical sub-classification 721 includes additional sub-classifications, including an "electrical" sub-classification 721*a*, a "pressure" sub-classification 721*b*, and a "temperature" sub-classification 721*c*, whereas the statistical sub-classification includes additional sub-classifications as well, including a "constant" sub-classification 723*a*, a "cyclic" sub-classification 723*b*, and a "monotonic" sub-classification 723*c*. Finally, the electrical sub-classification includes still additional sub-classifications, including a "current" sub-classification 721*aa* and a "voltage" sub-classification 721*ab*.

Thus, in one implementation of classifying the data variables, when asset data platform 102 classifies the data variables in the initial set of data variables, asset data platform 102 may refer to a data variable hierarchy, such as data variable hierarchy 700, and for each respective data variable in the initial set of data variables, asset data platform 102 may classify the respective data variable as one of the classifications or sub-classifications specified in the data variable hierarchy, such as one of classifications 710 or 720, and/or one of sub-classifications 711, 712, 721, 722, 723, 721*a*, 721*b*, 721*c*, 723*a*, 723*b*, 723*c*, 721*aa*, and/or 721*ab*. As representative examples, the engine temperature data variable may be classified as the temperature sub-classification 721*c*, the battery voltage data variable may be classified as the voltage sub-classification 721*ab*, and the data variable indicating the presence of absence of a specific fault condition may be classified as the state sub-classification 712. Of course, other examples are possible as well.

Given that the classifications are arranged in a hierarchical fashion, it should be understood that if a given data variable is classified as a particular sub-classification, asset data platform 102 may consider the given data variable to also be classified as the classification(s) or sub-classification(s) that exist above the particular sub-classification in the hierarchy. Returning to the example previously mentioned, as the engine temperature data variable is classified as the temperature sub-classification 721c, asset data platform 102 may also consider the engine temperature data variable to be classified under the physical sub-classification 721 and the continuous classification 720. Similarly, as the battery voltage data variable is classified as the voltage sub-classification 721ab, asset data platform may also consider the battery voltage data variable to be classified as the electrical sub-classification 721a, the physical sub-classification 721, and the continuous classification 720. And similarly still, as the data variable indicating the presence of absence of a specific fault condition is classified as the state sub-classification 712, asset data platform may also consider the data variable indicating the presence of absence of the specific fault condition to be classified as the categorical classification 710 as well.

It should be appreciated that the data variable hierarchy 700 is just one example of a possible hierarchy of possible classifications, and in other examples, other classifications are possible, as are other arrangements of the classifications to form other example hierarchies. For example, in some embodiments, the data variable hierarchy may be different for event prediction models that predict the occurrences of different events, or event prediction models that predict occurrences of events for different classes of assets.

Asset data platform 102 may determine how to classify each respective data variable in the initial set of data variables in various ways. In one example implementation, asset data platform 102 may refer to a classification lookup table and cross-reference each respective data variable to an entry in the look table to determine the specific classification of the respective data variable. In another example implementation, asset data platform 102 may refer to metadata associated with the given data variable to determine whether the metadata provides an indication of which classification to use for the given data variable. In still another example, asset data platform may prompt a user to provide an input indicating the classification of the given data variable. Other ways of classifying the data variables in the initial set of data variables are possible as well.

Returning to FIG. 6, at block 608, asset data platform 102 may next evaluate the extent to which each data variable in the initial set of data variables tends to be predictive of an event occurrence of the given type, and based on this evaluation, assign to each such data variable a respective metric (referred to herein as a "difference metric") that reflects this predictive tendency. These functions of evaluating and assigning respective difference metrics to the initial set of data variables (which may be referred to collectively as "scoring" the initial set of data variables) may take various forms.

As one possibility, asset data platform 102 may begin by obtaining historical data values for the initial set of data variables, which may include both (i) historical data values from times that are outside of any event window for any actual event occurrence and (ii) historical data values from times that are inside an event window for an actual event occurrence. Then, for each respective data variable in the initial set of data variables, asset data platform 102 may (a) compare the historical data values of the respective data variable that fall outside the model's event window to the historical data values of the respective data variable that fall inside the model's event window, and (b) based on this comparison, may derive a respective difference metric that represents the extent to which the historical data values of the respective data variable changed from outside the event window to inside the event window. In this respect, it should be appreciated that a data variable having a relatively high difference metric indicates that the values of the data variable tended to meaningfully change in the window of time leading up to an event occurrence of the given type, which suggests that the data variable may be more predictive of event occurrences of the given type. On the other hand, it should be appreciated that a data variable having a relatively low difference metric indicates that the values of the data variable tended not to meaningfully change in the window of the time leading up to an event occurrence of the given type, which suggests that the data variable may not be particularly predictive of event occurrences of the given type.

In one specific implementation of asset data platform 102 deriving a difference metric, but still by way of example, asset data platform 102 may derive a difference metric for a given data variable by determining the Kullback-Liebler divergence between the subset of historical data values for the given data variable falling outside the event window to the subset of historical data values falling inside the event widow. In this way, asset data platform 102 may consider the Kullback-Liebler divergence as the difference metric for the given data variable. In other implementations, asset data platform may derive a difference metric for a given data variable by using other statistical analyses as well.

In some embodiments of the present method, when evaluating the extent to which each data variable in the initial set of data variables tends to be predictive of an event occurrence of the given type and assigning to each such data variable a respective difference metric that reflects this predictive tendency, asset data platform 102 may take into account the classification of the data variables, as may be determined above at block 606. In this respect, asset data platform 102 may use a different technique to derive the difference metric for data variables classified as one type of classification and use another, perhaps different, technique to derive the difference metric for data variables classified as another type of classification. In one example of this, and in accordance with the example data variable hierarchy 700 depicted in FIG. 7, for each respective data variable in the initial set of data variables that is classified as continuous, asset data platform 102 may derive a difference metric for those respective data variables by determining the Kullback-Liebler divergence between the sets of data values falling outside the event window to the set of data values falling inside the event widow. And for each respective data variable in the initial set of data variables that is classified as categorical, asset data platform 102 may derive a difference metric for those respective data variables by utilizing a different technique, examples of which may include a chi-squared test, an apriori algorithm, and/or a neural net autoencoder technique, among other possibilities.

Continuing at block 610, asset data platform 102 may next filter the initial set of data variables based on their respective difference metrics to thereby arrive at a filtered, initial set of data variables. This filtering may take various forms.

In accordance with one implementation of this filtering, asset data platform 102 may filter the initial set of data variables by comparing their respective difference metrics to a threshold difference metric (e.g., 0.5) and then selecting the data variables in the initial set having difference metrics that are greater than or equal to this threshold difference metric. In this respect, asset data platform 102 may define the filtered, initial set of data variables to include any data variable that has a difference metric greater than or equal to the threshold difference metric.

In accordance with another implementation of this filtering, asset data platform 102 may filter the initial set of data variables by sorting the initial set of data variables based on their respective difference metrics and then selecting a given number of these data variables that have the highest difference metrics. Examples of selecting a given number of these data variables that have the highest difference metrics include (i) selecting a particular number of the data variables that have the highest difference metrics (e.g., selecting the top five data variables), (ii) selecting a particular percentage of data variables that have the highest difference metrics (e.g., selecting the top 10% of the total number of data variables), or (iii) selecting a particular number of the data variables that have the highest difference metrics, where the particular number is computed as a function of the total number of data variables (e.g., computing the logarithm of the total number of data variables, and then selecting that number of data variables). In this respect, asset data platform 102 may define the filtered, initial set of data variables to include any data variable that is among the top given number, top percentage, or determined as a result of computing the function of data variables by difference metric. Other ways of filtering the data variables in the initial set of data variables are possible as well.

At block 612, asset data platform 102 next applies a respective set of one or more transformations to each respective data variable in the filtered, initial set of data variables (or at least each of a subset of the filtered, initial set of data variables) to thereby arrive at a transformed set of data variables. In general, a transformation is any qualitative or quantitative manipulation to at least one data variable's values such that, once transformed, the transformed data variable represents the at least one data variable's values in a different way. The transformations applied in accordance with the present disclosure may take any of various forms.

As one possibility, a transformation of a given data variable may comprise a function of the values of the given data variable alone, which may be referred to herein as a single-variable transformation. Some representative examples of single-variable transformations of a given data variable include the average of the given data variable over a time period, the rate of change of the given data variable over a time period, the logarithm of the given data variable, and the variance of the given data variable, among others.

As another possibility, a transformation of a given data variable may comprise a function of the values of (i) the given data variable and (ii) one or more other data variables, which may be referred to herein as a multi-variable transformation. Some representative examples multi-variable transformations of a given data variable include the ratio of the rate of change of the given data variable to the rate of change of another data variable and an average of the variance of the given data variables and one or more other data variables, among others. In this respect, a multi-variable transformation may be viewed as a transformation that is applied to each of the data variables that are involved in the transformation.

There are many possible transformations that may be applied by asset data platform 102 to each respective data variable in the filtered, initial set of data variables, and it should be appreciated that the foregoing examples were provided for the sake of brevity, and that in practice, tens or even hundreds of different transformations of a given data variable may be possible.

To illustrate with a real-world example, if one data variable in the filtered, initial set of data variables is engine temperature and another data variable in the filtered, initial set of data variables is battery voltage, a possible single-variable transformation of the engine temperature data variable may be average engine temperature on a week-by-week basis, whereas another possible single-variable transformation of the engine temperature may be maximum engine temperature on a daily basis. And one possible multi-variable transformation of the engine temperature data variable and/or the battery voltage data variable may be the ratio of average engine temperature on an hour-by-hour basis to average battery voltage on an hour-by-hour basis. Again, many other transformations are possible as well.

Further, in practice, asset data platform 102 may select the respective set of one or more transformations to apply to each respective data variable in the filtered, initial set of data variables based on various factors.

As a first possibility, asset data platform 102 may select a respective set of one or more transformations to apply to a respective data variable based on the classification of the respective data variable. For instance, each possible classification may have a corresponding set of transformations associated therewith. Thus, when selecting the respective set of one or more transformations to apply to a respective data variable, asset data platform 102 may (i) identify the classification of the given data variable, (ii) identify the set of one or more transformations associated with the identified classification, and (iii) include the identified set of one or more transformations in the respective set of one or more transformations to apply to the respective data variable.

In some implementations, the respective set of transformations associated with a given classification may include transformations that are appropriate to apply to data variables of the given classification and may omit transformations that are not appropriate to apply to data variables of the given classification, such as transformations that would not yield useful data. For instance, referring back to the example data variable hierarchy 700 of FIG. 7, for the radial classification 722, one example data variable that may be classified as the radial classification may be the radial angle of a rotor used during the generation of electric power. Accordingly, it may not yield useful data to apply an average angle transformation to this data variable. As such, an average angle transformation may be omitted from a respective set of transformations associated with the radial classification 722. In another example, data variables classified as the monotonic classification 723c may be data variables that have constantly increasing data values. As such, a transformation that involves taking the average of a monotonic data variable may not yield useful data; however, a transformation that involves taking the difference from one data value to the next may yield useful data. As such, transformations involving averages may be omitted from a respective set of transformations associated with the monotonic classification 723c, whereas transformations involving taking the difference from one data value to the next may be included in such a respective set of transformations. Other examples of transformations that may be included or omitted from respective sets of transformations associated with classifications are possible as well.

As a second possibility, asset data platform 102 may select a respective set of one or more transformations to apply to a respective data variable in the filtered, initial set of data variables based on data indicating the expected behavior of the respective data variable for the given type of event to be predicted by the event prediction model being created. For instance, the data analytics platform may maintain or have access to data indicating that certain data variables are expected to behave a certain way in the window of time preceding an event occurrence of the given type, examples of which may include data indicating that engine temperature is expected to rise dramatically prior to an engine failure and/or that engine oil viscosity is expected to drop dramatically prior to an engine failure. Thus, the data analytics platform may take this expected behavior into account when selecting the respective sets of one or more transformations for these data variables, such that the one or more transformations selected for each data variable is more tailored to the expected behavior of that variable.

As a third possibility, asset data platform 102 may select the respective set of one or more transformations to apply to a respective data variable in the filtered, initial set of data variables based on an evaluation of an existing event prediction model that shares similarities with the event prediction model being created (e.g., an existing event prediction model for a similar type of event that occurs in another industry). For instance, if there is existing event prediction model that shares similarities with the event prediction model being created, asset data platform 102 may evaluate the input data variables for that existing event prediction model to identify any data variable that appears to be a transformed version of a data variable included in the filtered, initial set of data variables. If so, asset data platform 102 may then select a transformation that causes the same transformed data variable to be included in the transformed set of data variables for the event prediction model being created.

Asset data platform 102 may select the respective set of one or more transformations to apply to each respective data variable in the filtered, initial set of data variables in various other manners as well—including the possibility that the data analytics platform may select the respective set of one or more transformations to apply to each respective data variable in the filtered, initial set of data variables based on a combination of two or more of the foregoing factors.

In some embodiments, in addition to applying a respective set of one or more transformations to each respective data variable in the filtered, initial set of data variables in order to define the transformed set of data variables, the data analytics platform may also "pass through" one or more of the data variables in the filtered, initial set of data variables, such that the one or more passed-through data variables are included in the transformed set of data variables as well. In this respect, the data analytics platform may decide whether to "pass through" a respective data variable in the filtered, initial set of data variables based on any of various factors, including but not limited to the factors discussed above (e.g., the classification of the respective data variable, the expected behavior of the respective data variable, and/or whether the respective data variable is included as an input data variable for a comparable event prediction model).

For instance, after applying a respective set of one or more transformations to each data variable in the filtered, initial set of data variables, asset data platform 102 may define a transformed set of data variables that includes more, perhaps many more, data variables than were included in the filtered, initial set of data variables. To illustrate using another real-world example, for the engine temperature data variable, asset data platform 102 may apply two different transformations to this data variable and include these plus a pass-through of the initial data variable into the transformed set of data variables. By way of example, the transformed set of data variables may include: (1) the engine temperature data variable, which is a pass-though; (2) average engine temperature over a week's worth of time; and (3) rate of change of engine temperature over a week's worth of time. Other examples of transformed sets of data variables are possible as well.

After defining the transformed set of data variables, asset data platform 102 may then b optionally classify each respective data variable in the transformed set of data variables in a manner similar to that described above for the initial set of data variables. For instance, as explained above with respect to block 606, classifying each respective data variable in the transformed set of data variables may include, at a minimum, determining, whether each respective data variable should be classified as a "continuous" data variable or a "categorical" data variable, and perhaps whether each respective data variable should be further classified under one or more other sub-classifications, such as those set forth in example data variable hierarchy 700 (FIG. 7). Because the data variables were classified (at block 606) prior to asset data platform 102 applying respective sets of one or more transformations to the data variables, asset data platform 102 may assume that the classifications of the transformed data variables are the same classifications as the underlying data variables from which the data variables were transformed. However, as explained, some transformations may be multi-variable transformations, in which a transformation of a respective data variable replaces the respective data variable with a function of (i) the given data variable and (ii) one or more other data variables. For such multi-variable transformations, asset data platform 102 may classify the transformed data variable as an additional classification depending on the transformation. For instance, in the example in which the engine temperature data variable was transformed to arrive at a ratio of average engine temperature per hour to average battery voltage per hour data variable, asset data platform 102 may determine that this transformed data variable should be classified under the voltage sub-classification as well as the temperature sub-classification.

Continuing at block 614, asset data platform 102 may next evaluate the extent to which each respective data variable in the transformed set of data variable tends to be predictive of an event occurrence of the given type, and based on this evaluation, assign to each such data variable a respective difference metric that reflects this predictive tendency. These functions of evaluating and assigning respective difference metrics to the transformed set of data variables (which may be referred to collectively as "scoring" the transformed set of data variables) may be carried out in a similar manner to the above-described functions of evaluating and assigning respective difference metrics to the initial set of data variables.

For instance, asset data platform 102 may begin by obtaining historical values for the transformed set of data values, which may include both (i) historical data values from times that are outside of any event window for any actual event occurrence and (ii) historical data values from times that are inside an event window for an actual event occurrence. In this respect, obtaining the historical values for the transformed set of data variables may involve deriving such values based on the historical values of the initial set of data variables. For example, if a data variable in the transformed set of data variables is an average of a data variable in the initial set of data variables, asset data platform 102 may derive the historical data values of the data variable in the transformed set of data variables based on the historical values of the data variable in the initial set of data variables. Alternatively, however, historical values for data variables in the transformed set may already be available to asset data platform 102.

Then, for each respective data variable in the transformed set of data variables, asset data platform 102 may (a) compare the historical data values of the respective data variable that fall outside the model's event window to the historical data values of the respective data variable that fall inside the event window, and (b) based on this comparison, derive a respective difference metric that represents the extent to which the historical data values of the respective data variable changed from outside the event window to inside the event window. In this respect, as above, the particular technique to evaluate and assign the respective difference metrics to the respective data variables in the transformed set of data variables may vary depending on the classification of the respective data variables.

Continuing at block 616, after scoring the transformed set of data variables, asset data platform 102 may next filter the transformed set of data variables based on their respective different metrics to thereby arrive at a filtered, transformed set of data variables that appear to be most predictive of event occurrences of the given type. This filtering function may be carried out in a similar manner to the above-described function of filtering the initial set of data variables (e.g., by applying threshold difference metric or selecting a given number of data variables having the highest difference metrics).

After filtering the transformed set of data variables, asset data platform 102 may then proceed in one of two manners. As one option, asset data platform 102 may decide to conclude the input-variable-selection process, select the filtered, transformed set of data variables as the set of input variables for the event creation model, and proceed to the next phase of the process for creating the event prediction model (e.g., by evaluating historical data for the set of input variables using a machine learning technique). Alternatively, as another option, asset data platform 102 may decide to continue with the input-variable-selection process by applying another round of transformations to the filtered, transformed set of data variables—which may produce a second transformed set of data variables—and then optionally classifying, scoring, and filtering the second transformed set of data variables in order to produce a filtered, second transformed set of data variables.

In some embodiments, asset data platform 102 may decide to continue with the input-variable-selection process based on the consideration of one or more factors, such as (i) an evaluation of how many rounds an existing event prediction model that shares similarities with the event prediction model being created (e.g., an existing event prediction model for a similar type of event that occurs in another industry) used for its input-variable-selection process; (ii) a comparison of (a) the type or number of input variables currently selected as input variables in the current input-variable-selection process to (b) the type or number of input variables used as input variables in an existing event prediction model that shares similarities with the event prediction model being created (e.g., an existing event prediction model for a similar type of event that occurs in another industry); (iii) engaging in various optimization routines (such as genetic algorithms or simulated annealing, among others) designed to measure how well the currently-selected filtered, transformed set of data varbales are predictive of the given event type; or (iv) an evaluation of the total runtime of the current input-variable-selection process. For instance, the asset data platform 102 may evaluate one or more of the factors set forth above and, based on this evaluation, determine that is should engage in at least one more round of transformations to the filtered, transformed set of data variables—which, as explained, may produce a second transformed set of data variables—and then optionally classifying, scoring, and filtering the second transformed set of data variables in order to produce a filtered, second transformed set of data variables.

Figure 8:
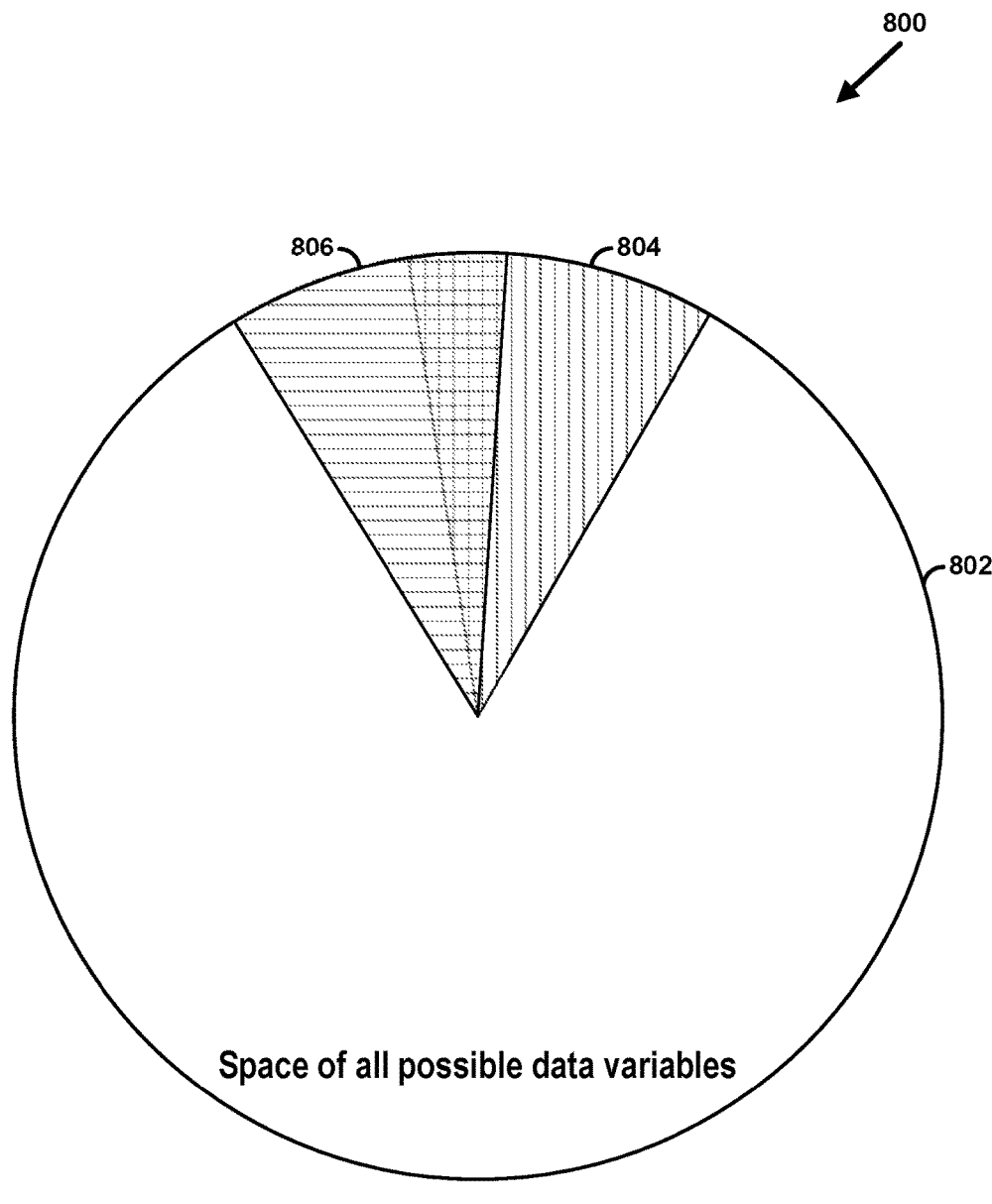
FIG. 8. depicts a representation of a data variable space being searched in accordance with one example of the present disclosure.

To help illustrate how the selection of the final set of input data variables may differ from the initial set of data variables, FIG. 8 depicts an example data variable space 800, in which circle 802 represents the space of all possible data variables available to asset data platform 102. Region 804 represents the space of data variables that, in one example, may have formed the initial set of data variables selected by the asset data platform 102 at block 604. As explained, in some embodiments, the data variables included within the initial set of data variables may be selected by the asset data platform based on user input, such as user input that may be the result of an SME hypothesis as to which data variables are predictive of the given type of event occurrence. And region 806 represents the space of data variables that, in one example, may be included in the final set of filtered, transformed data variables at which the asset data platform arrived via block 616. As depicted, this region 806 includes some, but not all, of the space represented by region 804, and includes some space not represented by region 804. This reflects that the disclosed process, in some examples, may arrive at a set of input data variables to use for the event creation model that is different from an initial set of variables selected as the result of an SME hypothesis.

Several variations to the disclosed process are possible as well. For instance, as one possible variation of the disclosed process, asset data platform 102 may be configured to apply only single-variable transformations to the filtered, initial set of data variables (as opposed to a combination of single- and multi-variable transformations), but may then be configured to use both single- and multi-variable transformations if asset data platform 102 proceeds with another round of transformations for the filtered, transformed set of data variables. As another possible variation, asset data platform may be configured to apply additional filtering during the filtering step 610. For instance, in some variations, prior to filtering the initial set of data variables at block 610, asset data platform engages in a correlation-determination step, whereby asset data platform 102 determines the extent to which any two or more data variables in the initial set of data variables are correlated with each other. In the event that any two or more data variables in the initial set of data variables are correlated to at least a threshold extent, the asset data platform may exclude at least one of these data variables from further consideration (i.e., the asset data platform may prevent at least one of these data variables from being included in the set of filtered, initial data variables). Further, in some variations, prior to filtering the initial set of data variables at block 610, the asset data platform 102 engages in a dimensionality reduction step, such as a principal component analysis step, by which asset data platform selects certain data variables from the initial set of data variables to exclude from further consideration (i.e., the asset data platform may prevent such selected data variables from being included in the set of filtered, initial data variables).

Advantageously, the disclosed process for creating event prediction models improves upon the existing technology for creating event prediction models, which suffers from all of the problems discussed above. For example, unlike the existing technology for creating event prediction models, the disclosed process utilizes an iterative, data-driven approach for selecting the particular set of input data variables to use in an event prediction model, which may produce an event prediction model that renders more accurate, timely predictions. As another example, the disclosed approach may leverage knowledge regarding the classification of data variables (e.g., as embodied in a data-variable hierarchy) to help improve the iterative, data-driven approach for selecting the particular set of input data variables to use in an event prediction model. As yet another example, the disclosed approach may leverage knowledge regarding existing event prediction models to help improve the iterative, data-driven approach for selecting the particular set of input data variables to use in an event prediction model. And as another example, the disclosed approach is relatively parameterized, and as such, can improve over time as the asset data platform engages in subsequent runs. The disclosed process provides several other improvements over existing technology as well.

While the disclosed approaches for using a data-driven approach to selecting a specific set of data variables that will be used by the event prediction model in order to render predictions have been described above for purposes of illustration in the context of an asset data platform, it should be understood that the disclosed approaches are not limited to this context. Rather, the disclosed approaches may be used in connection with any event prediction models that are configured to preemptively predict event occurrences, which may be employed in any of various technical fields.

V. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans", "operators", "users" or other entities, this is for purposes of example and explanation only. The claims should not be construed as requiring action by such actors unless explicitly recited in the claim language.

The invention claimed is:

1. A computing system comprising:
a communication interface;
at least one processor;
a non-transitory computer-readable medium; and
program instructions stored on the non-transitory computer-readable medium that are executable by the at least one processor to cause the computing system to perform functions comprising:
selecting an initial set of data variables to consider for use as input variables of a given event prediction model that is to predict event occurrences of a given type;
for each respective data variable in the initial set of data variables, (i) obtaining a respective set of historical data values of the respective data variable that includes a first subset of historical data values from times that are outside of any event window for any actual event occurrence and a second subset of historical data values from times that are inside an event window for an actual event occurrence, and (ii) determining a respective difference metric that indicates an extent to which the first subset of historical data values differ from the second subset of historical data values;
applying a respective set of one or more transformations to each of at least two data variables in the initial set of data variables and thereby defining a transformed set of data variables;
for each respective data variable in the transformed set of data variables, (i) obtaining a respective set of historical data values of the respective data variable that includes a first subset of historical data values from times that are outside of any event window for any actual event occurrence and a second subset of historical data values from times that are inside an event window for an actual event occurrence, and (ii) determining a respective difference metric that indicates an extent to which the first subset of historical data values differ from the second subset of historical data values;
based on the respective difference metrics for the respective data variables in the transformed set of data variables, filtering the transformed set of data variables down to a filtered, transformed set of data variables;
using the filtered, transformed set of data variables as a basis for selecting the input variables of the event prediction model,
outputting by the event prediction model, based on the filtered, transformed set of data variables, a predicted event occurrence of a given type.

2. The computing system of claim 1 further comprising:
based on the respective difference metrics for the respective data variables in the initial set of data variables, filtering the initial set of data variables down to the initial set of data variables,
wherein the initial set of variables comprises a filtered initial set of data variables,
wherein filtering the initial set of data variables down to the filtered, initial set of data variables based on the respective difference metrics for the respective data variables in the initial set of data variables comprises one of (a) filtering the initial set of data variables down to a filtered, initial set of data variables that includes any data variable in the initial set of data variables having a respective difference metric that is greater than or equal to a threshold difference metric or (b) sorting the initial set of data variables based on the respective difference metrics for the respective data variables in the initial set of data variables to a sorted, initial set of data variables such that the data variables in the sorted, initial set of data variables are sorted from a highest difference metric to a lowest difference metric, and then filtering the sorted, initial set of data variables down to a filtered, initial set of data variables that includes a given number of data variables that are within a top one or more of the data variables in the sorted, initial set of data variables.

3. The computing system of claim 1, further comprising program instructions stored on the non-transitory computer-readable medium that are executable by the at least one processor to cause the computing system to perform functions comprising:
while applying the respective set of one or more transformations to each of at least two data variables in the initial set of data variables, passing through at least one data variable in the initial set of data variables for inclusion in the transformed set of data variables.

4. The computing system of claim 1, further comprising program instructions stored on the non-transitory computer-readable medium that are executable by the at least one processor to cause the computing system to perform functions comprising:
before determining the respective difference metrics for the respective data variables in the initial set of data variables, determining a respective classification of each respective data variable in the initial set of data variables, and
wherein the respective classifications of the data variables in the initial set of data variables are used as a basis for determining the respective difference metrics for the respective data variables in the initial set of data variables.

5. The computing system of claim 4, further comprising program instructions stored on the non-transitory computer-readable medium that are executable by the at least one processor to cause the computing system to perform functions comprising:
prior to applying the respective set of one or more transformations to each of the at least two data variables in the initial set of data variables, selecting the respective set of one or more transformations to apply to each of the at least two data variables in the initial set of data variables based on one or more of (i) the respective classification of the data variable, (ii) data indicating an expected behavior of the data variable in advance of an event occurrence of the given type, or (iii) an evaluation of an existing event prediction model that shares similarities with the given event prediction model.

6. The computing system of claim 1, further comprising program instructions stored on the non-transitory computer-readable medium that are executable by the at least one processor to cause the computing system to perform functions comprising:
before determining the respective difference metrics for the respective data variables in the transformed set of data variables, determining a respective classification of each respective data variable in the transformed set of data variables, and
wherein the respective classifications of the data variables in the transformed set of data variables are used as a basis for determining the respective difference metrics for the respective data variables in the transformed set of data variables.

7. The computing system of claim 1, wherein using the filtered, transformed set of data variables as a basis for selecting the input variables of the event prediction model comprises:
selecting the filtered, transformed set of data variables for use as the input variables of the event prediction model.

8. The computing system of claim 1, wherein using the filtered, transformed set of data variables as a basis for selecting the input variables of the event prediction model comprises:
applying a respective set of one or more transformations to each of at least two data variables in the filtered, transformed set of data variables and thereby defining a second transformed set of data variables;
for each respective data variable in the second transformed set of data variables, obtaining a respective set of historical data values of the respective data variable that includes a first subset of historical data values from times that are outside of any event window for any actual event occurrence and a second subset of historical data values from times that are inside an event window for an actual event occurrence, and (ii) determining a respective difference metric that indicates an extent to which the first subset of historical data values differ from the second subset of historical data values;
based on the respective difference metrics for the respective data variables in the second transformed set of data variables, filtering the second transformed set of data variables down to a filtered, second transformed set of data variables; and
selecting the filtered, second transformed set of data variables for use as the input variables of the event prediction model.

9. The computing system of claim 1, wherein the respective set of one or more transformations applied to a given data variable in the initial set of data variables comprises a function of the given data variable and one or more additional data variables.

10. The computing system of claim 1, wherein obtaining the respective set of historical data values of a given data variable in the transformed set of data variables comprises deriving the historical data values of the given data variable in the transformed set of data variables based on the respective set of historical data values of one of the data variables in the initial set of data variables.

11. A method performed by a computing system, the method comprising:
selecting an initial set of data variables to consider for use as input variables of a given event prediction model that is to predict event occurrences of a given type;
for each respective data variable in the initial set of data variables, (i) obtaining a respective set of historical data values of the respective data variable that includes a first subset of historical data values from times that are outside of any event window for any actual event occurrence and a second subset of historical data values from times that are inside an event window for an actual event occurrence, and (ii) determining a respective difference metric that indicates an extent to which the first subset of historical data values differ from the second subset of historical data values;
applying a respective set of one or more transformations to each of at least two data variables in the initial set of data variables and thereby defining a transformed set of data variables;
for each respective data variable in the transformed set of data variables, (i) obtaining a respective set of historical data values of the respective data variable that includes a first subset of historical data values from times that are outside of any event window for any actual event occurrence and a second subset of historical data values from times that are inside an event window for an actual event occurrence, and (ii) determining a respective difference metric that indicates an extent to which the first subset of historical data values differ from the second subset of historical data values;
based on the respective difference metrics for the respective data variables in the transformed set of data variables, filtering the transformed set of data variables down to a filtered, transformed set of data variables;
using the filtered, transformed set of data variables as a basis for selecting the input variables of the event prediction model; and outputting by the event prediction model, based on the filtered, transformed set of data variables, a predicted event occurrence of a given type.

12. The method of claim 11, further comprising based on the respective difference metrics for the respective data variables in the initial set of data variables, filtering the initial set of data variables down to the initial set of data variables,
wherein the initial set of variables comprises a filtered initial set of data variables,
wherein filtering the initial set of data variables down to the filtered, initial set of data variables based on the respective difference metrics for the respective data variables in the initial set of data variables comprises one of (a) filtering the initial set of data variables down to a filtered, initial set of data variables that includes any data variable in the initial set of data variables having a respective difference metric that is greater than or equal to a threshold difference metric or (b) sorting the initial set of data variables based on the respective difference metrics for the respective data variables in the initial set of data variables to a sorted, initial set of data variables such that the data variables in the sorted, initial set of data variables are sorted from a highest difference metric to a lowest difference metric, and then filtering the sorted, initial set of data variables down to a filtered, initial set of data variables that includes a given number of data variables that are within a top one or more of the data variables in the sorted, initial set of data variables.

13. The method of claim 11, further comprising:
while applying the respective set of one or more transformations to each of at least two data variables in the initial set of data variables, passing through at least one data variable in the initial set of data variables for inclusion in the transformed set of data variables.

14. The method of claim 11, further comprising:
before determining the respective difference metrics for the respective data variables in the initial set of data variables, determining a respective classification of each respective data variable in the initial set of data variables, and
wherein the respective classifications of the data variables in the initial set of data variables are used as a basis for determining the respective difference metrics for the respective data variables in the initial set of data variables.

15. The method of claim 11, wherein using the filtered, transformed set of data variables as a basis for selecting the input variables of the event prediction model comprises:
applying a respective set of one or more transformations to each of at least two data variables in the filtered, transformed set of data variables and thereby defining a second transformed set of data variables;
for each respective data variable in the second transformed set of data variables, obtaining a respective set of historical data values of the respective data variable that includes a first subset of historical data values from times that are outside of any event window for any actual event occurrence and a second subset of historical data values from times that are inside an event window for an actual event occurrence, and (ii) determining a respective difference metric that indicates an extent to which the first subset of historical data values differ from the second subset of historical data values;
based on the respective difference metrics for the respective data variables in the second transformed set of data variables, filtering the second transformed set of data variables down to a filtered, second transformed set of data variables; and
selecting the filtered, second transformed set of data variables for use as the input variables of the event prediction model.

16. A non-transitory computer-readable storage medium having program instructions stored thereon that are executable to cause a computing system to:
select an initial set of data variables to consider for use as input variables of a given event prediction model that is to predict event occurrences of a given type;
for each respective data variable in the initial set of data variables, (i) obtain a respective set of historical data values of the respective data variable that includes a first subset of historical data values from times that are outside of any event window for any actual event occurrence and a second subset of historical data values from times that are inside an event window for an actual event occurrence, and (ii) determine a respective difference metric that indicates an extent to which the first subset of historical data values differ from the second subset of historical data values;
apply a respective set of one or more transformations to each of at least two data variables in the initial set of data variables and thereby defining a transformed set of data variables;
for each respective data variable in the transformed set of data variables, (i) obtain a respective set of historical data values of the respective data variable that includes a first subset of historical data values from times that are outside of any event window for any actual event occurrence and a second subset of historical data values from times that are inside an event window for an actual event occurrence, and (ii) determine a respective difference metric that indicates an extent to which the first subset of historical data values differ from the second subset of historical data values;
based on the respective difference metrics for the respective data variables in the transformed set of data variables, filter the transformed set of data variables down to a filtered, transformed set of data variables; and
use the filtered, transformed set of data variables as a basis for selecting the input variables of the event prediction model; and
output by the event prediction model, based on the filtered, transformed set of data variables, a predicted event occurrence of a given type.

17. The non-transitory computer-readable storage medium of claim 16, wherein the program instructions are further executable to cause the computing system to
based on the respective difference metrics for the respective data variables in the initial set of data variables, filtering the initial set of data variables down to the initial set of data variables,
wherein the initial set of variables comprises a filtered initial set of data variables,
wherein filtering the initial set of data variables down to a filtered, initial set of data variables based on the respective difference metrics for the respective data variables in the initial set of data variables comprises one of (a) filtering the initial set of data variables down to a filtered, initial set of data variables that includes any data variable in the initial set of data variables having a respective difference metric that is greater than or equal to a threshold difference metric or (b)

sorting the initial set of data variables based on the respective difference metrics for the respective data variables in the initial set of data variables to a sorted, initial set of data variables such that the data variables in the sorted, initial set of data variables are sorted from a highest difference metric to a lowest difference metric, and then filtering the sorted, initial set of data variables down to a filtered, initial set of data variables that includes a given number of data variables that are within a top one or more of the data variables in the sorted, initial set of data variables.

18. The non-transitory computer-readable storage medium of claim 16, wherein the program instructions are further executable to cause a computing system to:
while applying the respective set of one or more transformations to each of at least two data variables in the initial set of data variables, pass through at least one data variable in the initial set of data variables for inclusion in the transformed set of data variables.

19. The non-transitory computer-readable storage medium of claim 16, wherein the program instructions are further executable to cause a computing system to:
before determining the respective difference metrics for the respective data variables in the initial set of data variables, determine a respective classification of each respective data variable in the initial set of data variables, and
wherein the respective classifications of the data variables in the initial set of data variables are used as a basis for determining the respective difference metrics for the respective data variables in the initial set of data variables.

20. The non-transitory computer-readable storage medium of claim 16, wherein using the filtered, transformed set of data variables as a basis for selecting the input variables of the event prediction model comprises:
applying a respective set of one or more transformations to each of at least two data variables in the filtered, transformed set of data variables and thereby defining a second transformed set of data variables;
for each respective data variable in the second transformed set of data variables, obtaining a respective set of historical data values of the respective data variable that includes a first subset of historical data values from times that are outside of any event window for any actual event occurrence and a second subset of historical data values from times that are inside an event window for an actual event occurrence, and (ii) determining a respective difference metric that indicates an extent to which the first subset of historical data values differ from the second subset of historical data values;
based on the respective difference metrics for the respective data variables in the second transformed set of data variables, filtering the second transformed set of data variables down to a filtered, second transformed set of data variables; and
selecting the filtered, second transformed set of data variables for use as the input variables of the event prediction model.

\* \* \* \* \*